(12) United States Patent
Oshiumi et al.

(10) Patent No.: US 7,649,639 B2
(45) Date of Patent: Jan. 19, 2010

(54) DEVICE USAGE LIMITING METHOD, APPARATUS AND PROGRAM

(75) Inventors: Makoto Oshiumi, Saitama (JP); Atsuhiro Itoh, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1032 days.

(21) Appl. No.: 10/939,504

(22) Filed: Sep. 14, 2004

(65) Prior Publication Data

US 2005/0200880 A1  Sep. 15, 2005

(30) Foreign Application Priority Data

Mar. 12, 2004 (JP) ............... 2004-070919
Jun. 24, 2004 (JP) ............... 2004-186425

(51) Int. Cl.
*G06F 15/00* (2006.01)
(52) U.S. Cl. .............. 358/1.13; 358/1.14; 358/1.16; 719/321; 399/79; 399/80
(58) Field of Classification Search .............. 358/1.13, 358/1.14, 1.16, 1.15; 399/79, 80; 719/321
See application file for complete search history.

(56) References Cited

U.S. PATENT DOCUMENTS

| 6,202,092 | B1 * | 3/2001 | Takimoto ............... 358/1.13 |
| 6,581,092 | B1 * | 6/2003 | Motoyama et al. ......... 709/219 |
| 6,738,587 | B1 * | 5/2004 | Hoene et al. ............ 399/77 |
| 6,952,280 | B1 * | 10/2005 | Tanimoto ............... 358/1.15 |
| 6,985,244 | B1 * | 1/2006 | Bhogal et al. ............ 358/1.15 |
| 7,167,919 | B2 * | 1/2007 | Iwamoto et al. .......... 709/229 |
| 7,305,566 | B2 * | 12/2007 | Masaki ................. 713/189 |
| 7,313,699 | B2 * | 12/2007 | Koga ................... 713/170 |
| 7,400,427 | B2 * | 7/2008 | Honma ................. 358/1.15 |
| 7,487,233 | B2 * | 2/2009 | Iwamoto et al. .......... 709/223 |
| 2004/0101326 | A1 * | 5/2004 | Hoene et al. ............ 399/77 |
| 2004/0141203 | A1 * | 7/2004 | Honma ................. 358/1.15 |
| 2005/0200880 | A1 * | 9/2005 | Oshiumi et al. .......... 358/1.14 |
| 2006/0132824 | A1 * | 6/2006 | Aritomi ................ 358/1.14 |
| 2007/0008577 | A1 * | 1/2007 | Matsuura et al. ......... 358/1.15 |
| 2007/0101345 | A1 * | 5/2007 | Takagi ................. 719/321 |
| 2007/0172281 | A1 * | 7/2007 | Inoue et al. ............ 400/62 |
| 2008/0007758 | A1 * | 1/2008 | Miyashita .............. 358/1.14 |
| 2009/0089463 | A1 * | 4/2009 | Iga .................... 710/37 |

FOREIGN PATENT DOCUMENTS

| JP | A 2001-117737 | 4/2001 |
| JP | A 2001-306278 | 11/2001 |

* cited by examiner

*Primary Examiner*—Kimberly A Williams
(74) *Attorney, Agent, or Firm*—Oliff & Berridge, PLC

(57) ABSTRACT

A usage limiting method for a device executing a job generated by a driver, in which a driver corresponding to a device manages a usage state of the device, and when the usage state agrees with a predetermined condition, the driver stops generation of a job corresponding to the device.

24 Claims, 22 Drawing Sheets

DEVICE USAGE LIMITING METHOD, APPARATUS AND PROGRAM

BACKGROUND OF THE INVENTION

1. Field of the Invention

The present invention relates to a device usage limiting method, apparatus and program, and more particularly to a device usage limiting method, apparatus and program which limit the use of the device according to a use condition of the device.

2. Description of Related Art

With the spread of networks in these years, various types of devices such as printers, facsimiles and scanners come to correspond to the networks and have many occasions of commonly used by plural users.

The devices corresponding to the networks have an advantage that plural users can use them but also have a possibility that a user who is desirably restricted the use of them from a management viewpoint can use them. Therefore, there have been proposed many technologies of limiting the use of such a device. Among such technologies, there is a system that each user can use a ticket issued by a server limiting printing to print within the limitation determined for each user (e.g., Japanese Patent Application Laid-Open No. 2001-117737).

Where the device is allowed to be used by many users, the individual users are often charged. Especially, where an indefinite number of users are allowed to use the device, a prepaid type charging system is often employed.

As the prepaid type charging, it is general to use a method that a user ID is issued to a user who wants to use the device, and an access volume corresponding to a prepaid amount is managed in association with the user ID. This method requires a management server for managing the user ID and the access volume.

Japanese Patent Application Laid-Open No. 2001-306278 describes a print system capable of automatically deleting an installed driver after completion of printing.

Where the use of a device such as a printer is limited and if a user who is not allowed to use the device happens to install a device driver of the device in error or if a user installs a device driver of the device before the device usage limit is implemented and later is not registered as a user allowed to use the device, the device driver remains installed in a terminal device such as a PC (personal computer) to be a client unless the device driver is uninstalled by the user. In such a case, the user might erroneously operate the device to use it.

There may be a user who intentionally uses a usage limited device. In such a case, unnecessary data is sent to a network if the device is an output device such as a printer.

Therefore, it is not desirable for the user to operate erroneously or intentionally so to use the device of which use by the user is limited.

Where a prepaid system is employed to bill the user for use of the device, a management server is often necessary to manage the user ID or the like. Therefore, even when charging processing is employed for a small-scale system having a small number of users or a system temporarily used at an event hole or the like, the management server is necessary, and its operation involves a large amount of costs.

SUMMARY OF THE INVENTION

The present invention has been made in view of the above circumstances and provides a device usage limiting method, apparatus and program that can prohibit a user who is limited the usage of a device from operating to use the device.

An aspect of the present invention is a usage limiting method for a device executing a job generated by a driver, wherein a driver corresponding to a device manages a usage state of the device, and when the usage state agrees with a predetermined condition, the driver stops generation of a job corresponding to the device.

Another aspect of the present invention is a usage limiting method for a device executing a job generated by a driver, wherein the device manages a usage state of each driver for the device and, when the usage state agrees with a predetermined condition, the device rejects execution of a job sent from a corresponding driver.

According to the present invention, a device can be prevented from being used by a user who is not allowed to use it, and intentional misuse of the device by the user can be prevented.

BRIEF DESCRIPTION OF THE DRAWINGS

Embodiments of the present invention will be described in detail based on the following figures, wherein.

DETAILED DESCRIPTION OF THE INVENTION

Embodiments of the device usage limiting method, apparatus and program according to the present invention will be described in detail with reference to the accompanying figures.

EXAMPLE 1

Figure 1:
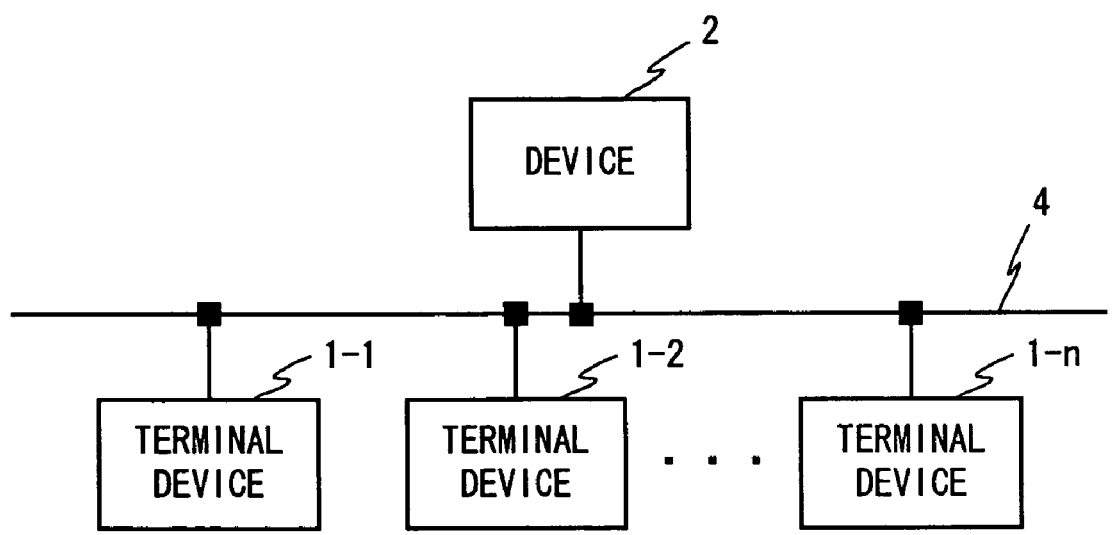
FIG. 1 is a diagram showing a configuration example of the network according to Example 1.

FIG. 1 is a diagram showing a configuration example of the network according to Example 1. As shown in FIG. 1, the network of Example 1 has plural terminal devices 1 (1-1 to 1-*n*) connected to a device 2 over a network 4.

The terminal devices 1 are computers such as PCs which operate as clients, run a variety of application software and execute a variety of processing by the device 2. When the usage of the device 2 is limited, the terminal devices 1 cannot use the device 2 because the device driver of the device 2 is uninstalled by the processing described later. The device 2 is a network device such as a printer, a facsimile, a scanner or the like.

Figure 2:
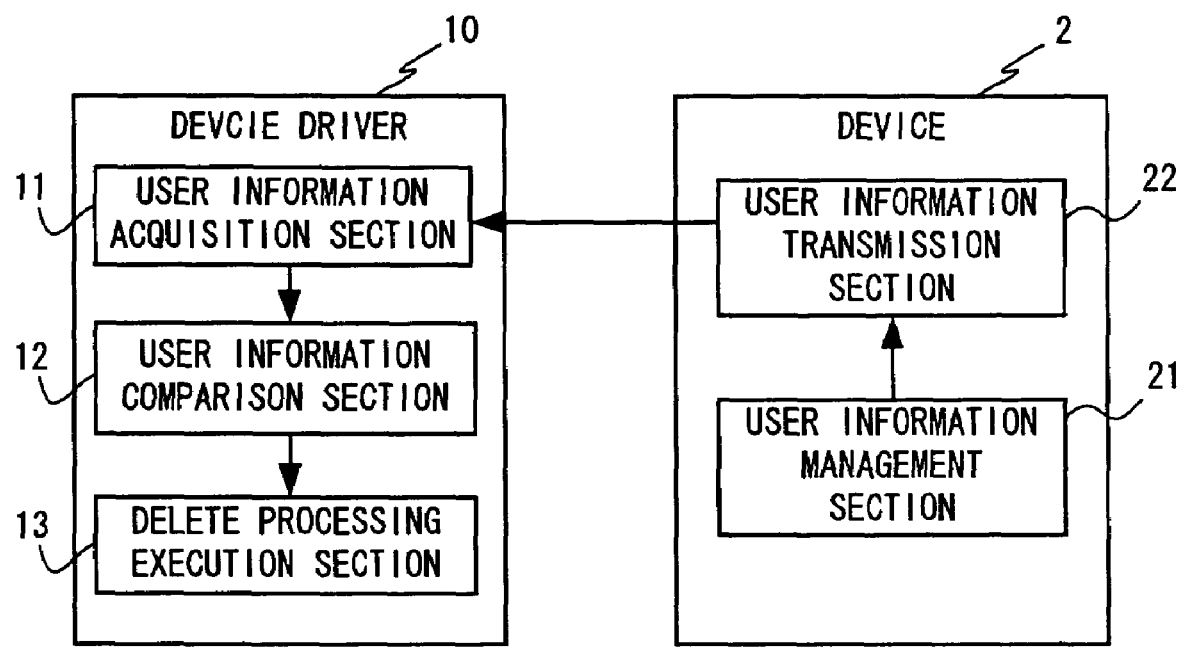
FIG. 2 is a block diagram showing a functional structure of a device driver 10 which is installed on a terminal device 1 and a functional structure of a device 2.

Here, a restriction on usage of the device in Example 1 will be described. FIG. 2 is a block diagram showing a functional structure of a device driver 10 which is installed on the terminal device 1 and a functional structure of the device 2.

As shown in FIG. 2, the device driver 10 comprises a user information acquisition section 11, a user information comparison section 12, and a delete processing execution section 13. The device 2 comprises a user information management section 21 and a user information transmission section 22.

The user information acquisition section 11 obtains user information indicating a usage-permitted user of the device 2 from the device 2. The user information comparison section 12 obtains user information of the terminal device 1 in which the device driver 10 is installed and compares the user information obtained from the terminal device 1 with the user information obtained by the user information acquisition section 11. If it is found as a result of the comparison by the user information comparison section 12 that the user information obtained from the terminal device 1 is not contained in the user information obtained from the device 2, the delete processing execution section 13 makes the terminal device 1 uninstall the device driver 10.

The user information management section 21 manages the user information on the user registered as the usage-permitted user of the device 2. In response to the request from the user information acquisition section 11 of the device driver 10, the user information transmission section 22 sends the user information managed by the user information management section 21 to the device driver 10.

The device 2 can be a conventionally used device if it can register the usage-permitted user in it.

Figure 3:
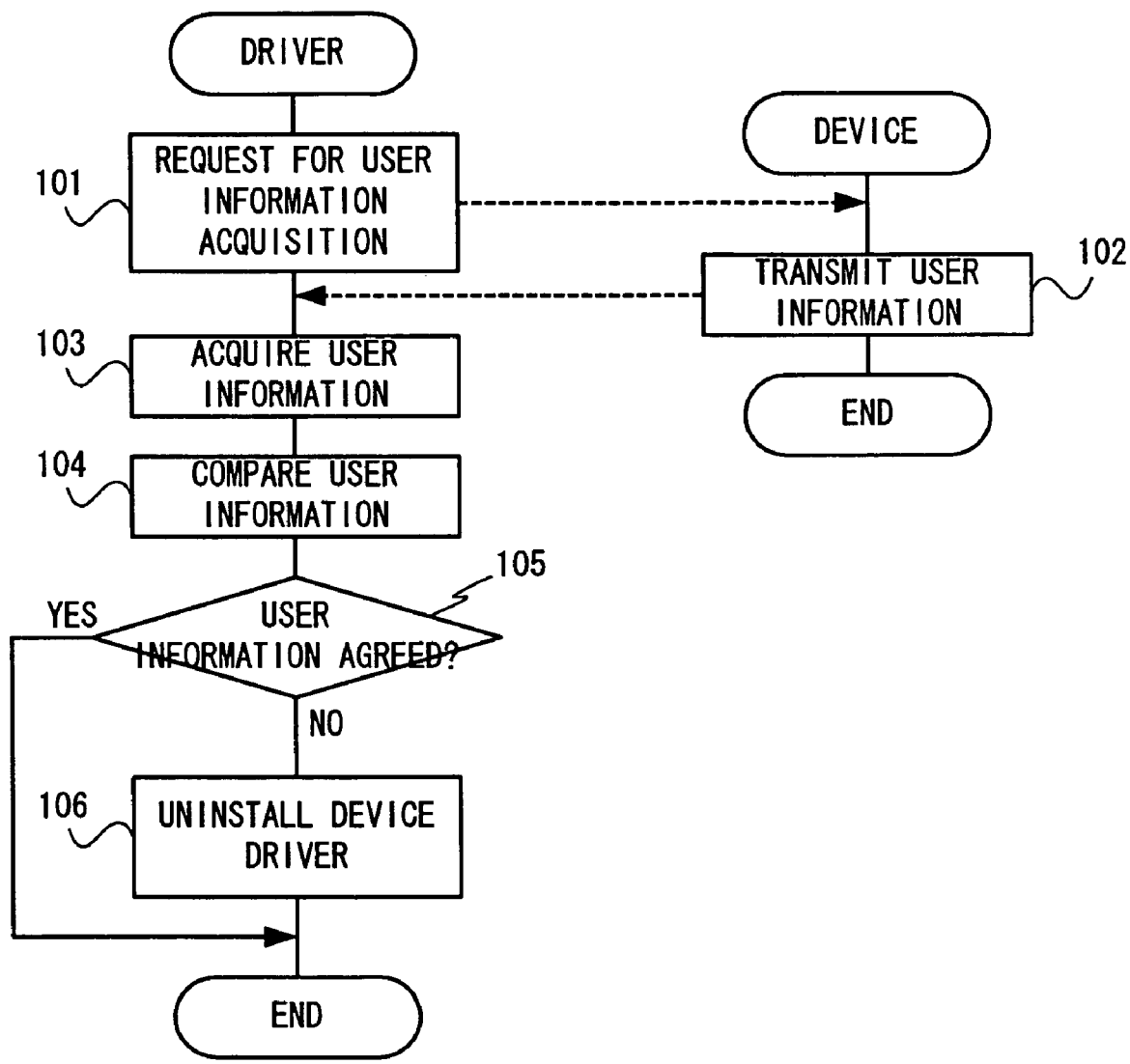
FIG. 3 is a flow chart showing a flow of management processing of the device driver in Example 1.

Then, management processing of the device driver configured as shown in FIG. 2 will be described. FIG. 3 is a flow chart showing a flow of the device driver management processing.

When activated, the device driver 10 sends a user information obtaining request to the device 2 (step 101). The device 2 responds to the obtaining request, the user information transmission section 22 sends user information (step 102), and the user information acquisition section 11 obtains the user information (step 103).

Subsequently, the user information comparison section 12 obtains the user information of the terminal device 1 in which the device driver 10 is installed and compares the user information obtained from the terminal device 1 with the user information obtained by the user information acquisition section 11 (step 104). When it is found as a compared result that the user information obtained from the terminal device 1 agrees with any of the user information obtained from the device 2 (YES in step 105), the device driver management processing is terminated without conducting any processing. But, when the user information obtained from the terminal device 1 does not agree with any of the user information obtained from the device 2 (NO in step 105), the delete processing execution section 13 makes the terminal device 1 uninstall the device driver 10 (step 106) and terminates the device driver management processing.

EXAMPLE 2

Then, Example 2 will be described. The network of Example 2 has the same configuration as in Example 1 as shown in FIG. 1.

Figure 4:
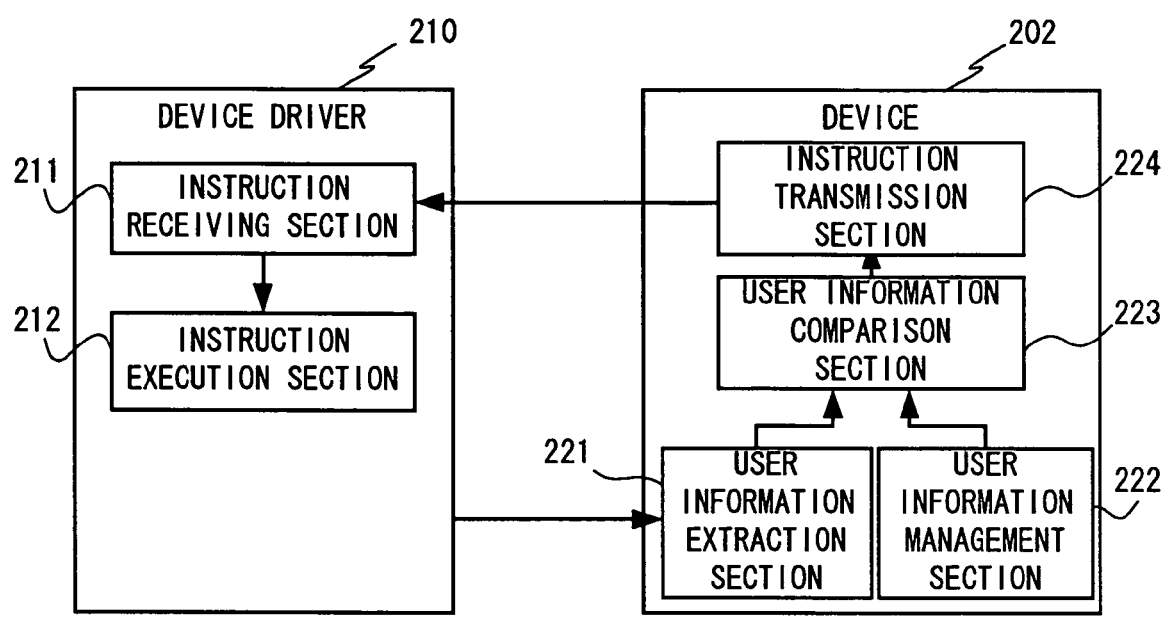
FIG. 4 is a block diagram showing a functional structure of a device driver 210 which is installed in a terminal device corresponding to the terminal device 1 and a functional structure of a device 202 corresponding to the device 2.

Here, a restriction on usage of the device in Example 2 will be described. FIG. 4 is a block diagram showing a functional structure of a device driver 210 which is installed in a terminal device corresponding to the terminal device 1 and a functional structure of a device 202 corresponding to the device 2.

As shown in FIG. 4, the device driver 210 comprises an instruction receiving section 211 and an instruction execution section 212. The device 202 comprises a user information extraction section 221, a user information management section 222, a user information comparison section 223 and an instruction transmission section 224.

The instruction receiving section 211 receives an instruction transmitted from the device 202. The instruction execution section 212 executes the instruction received by the instruction receiving section 211. Specifically, the instruction receiving section 211 receives a delete instruction instructing uninstallation of the device driver 210, and the instruction execution section 212 makes a terminal device having the device driver 210 installed uninstall the device driver 210 according to the delete instruction.

The user information extraction section 221 extracts user information indicating the user of the terminal device in which the device driver 210 is installed from a job sent from the device driver 210. The user information management section 222 manages the user information on the user registered as the usage-permitted user of the device 202. The user information comparison section 223 compares the user information extracted by the user information extraction section 221 with the user information managed by the user information management section 222. If it is found as a result of the comparison made by the user information comparison section 222 that the user information extracted by the user information extraction section 221 is not contained in the user information managed by the user information management section 222, the instruction transmission section 224 sends a delete instruction instructing the uninstallation of the device driver 210 to the device driver 210.

Figure 5:
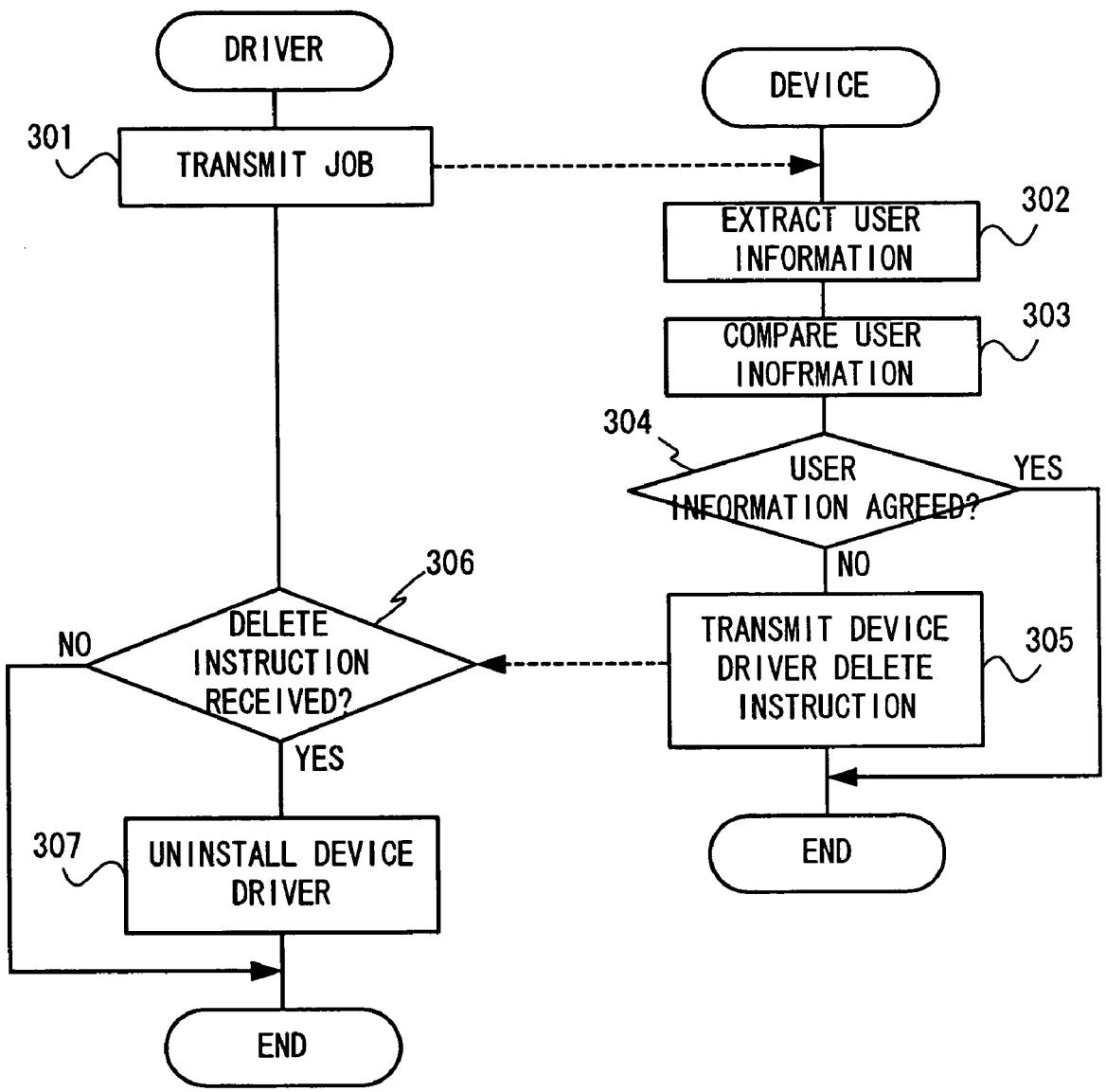
FIG. 5 is a flow chart showing a flow of management processing of the device driver in Example 2.

Then, management processing of the device driver configured as shown in FIG. 4 will be described. FIG. 5 is a flow chart showing a flow of the device driver management processing.

For example, when the device 202 is a printer, first, the device driver 210 generates a print job according to a print instruction from unshown application software or the like. When the generated job is sent to the device 202 (step 301), the user information extraction section 221 of the device 202 extracts the user information indicating the user of the terminal device in which the device driver 210 is installed from the job (step 302).

Subsequently, the user information comparison section 223 compares the user information extracted by the user information extraction section 221 with the user information managed by the user information management section 222 (step 303). If it is found as a result of the comparison that the user information extracted by the user information extraction section 221 agrees with any of the user information managed by the user information management section 222 (YES in step 304), the device driver management processing is terminated without conducting any processing. At this time, the device driver 210 does not receive any delete instruction (NO in step 306), so that the device driver 210 also terminates the device driver management processing without conducting any processing.

Meanwhile, if the user information extracted by the user information extraction section 221 does not agree with any of the user information managed by the user information management section 222 (NO in step 304), the instruction transmission section 224 sends a delete instruction to the device driver 210 (step 305). When this delete instruction is received by the instruction receiving section 211 (YES in step 306), the instruction execution section 212 makes the terminal device in which the device driver 210 is installed uninstall the device driver 210 (step 307) and terminates the device driver management processing.

EXAMPLE 3

Figure 6:
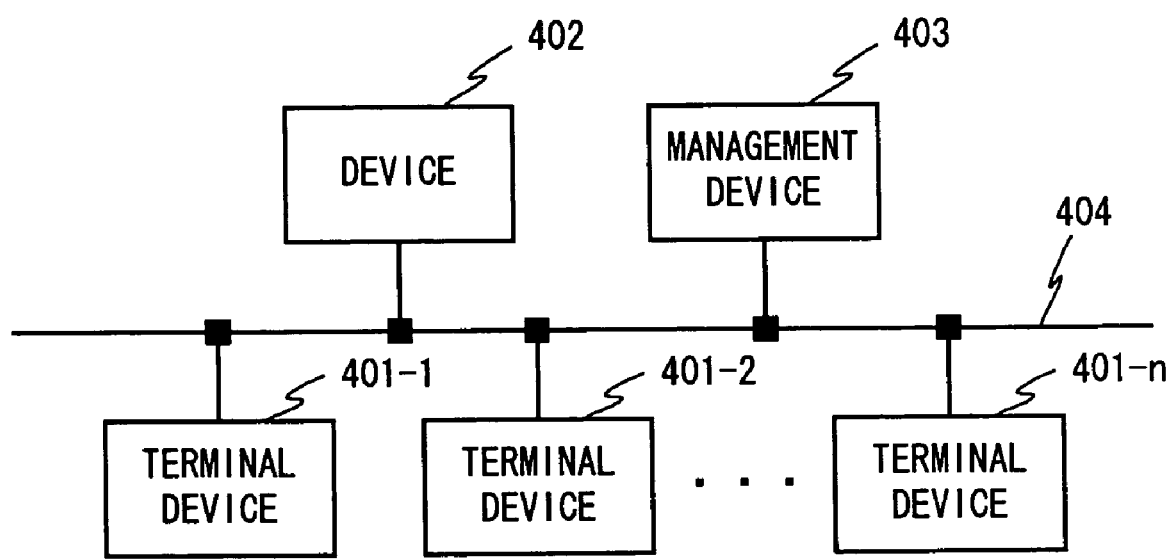
FIG. 6 is a diagram showing a configuration example of the network in Example 3.

FIG. 6 is a diagram showing a configuration example of a network in Example 3. As shown in FIG. 6, the network of Example 3 has plural terminal devices 401 (401-1 to 401-n) which are connected to a device 402 and a management device 403 over a network 404.

The terminal devices 401 are computers such as PCs which operate as clients, run a variety of application software and execute a variety of processing using the device 402. When the usage of the device 402 is limited, the terminal devices 401 cannot use the device 402 because the device driver of the device 402 is uninstalled by the processing described later.

The device 402 is a network device such as a printer, a facsimile, a scanner or the like. The device 402 can be a conventionally used one without any modification.

The management device 403 is a computer such as a server and manages the device driver installed in the terminal device 401.

Figure 7:
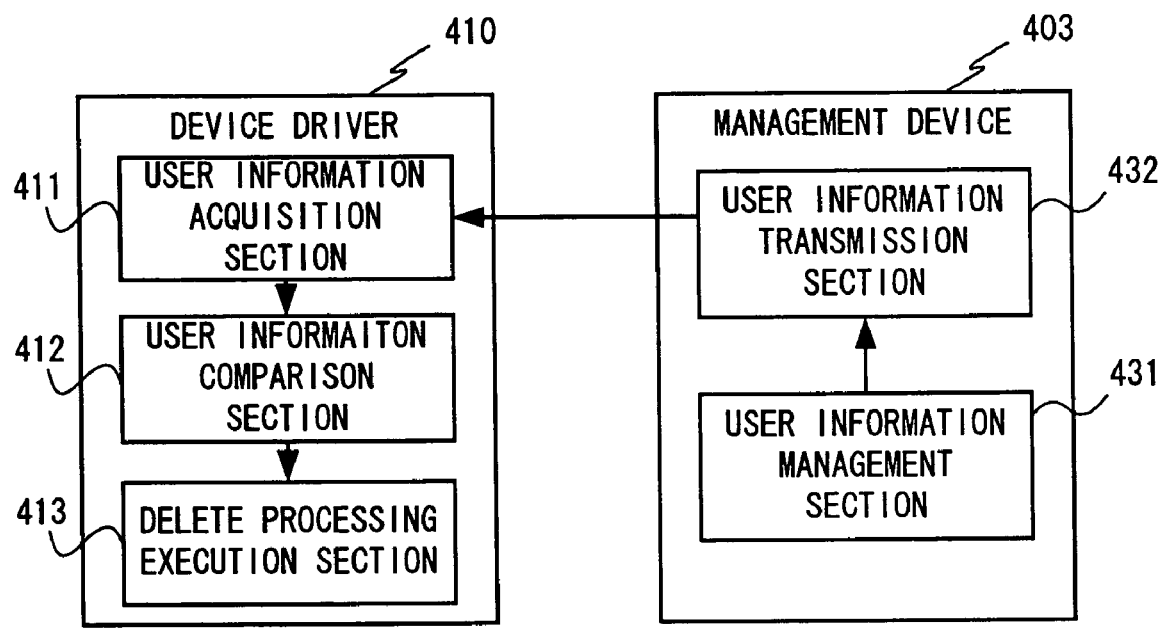
FIG. 7 is a block diagram showing a functional structure of a device driver 410 which is installed in a terminal device 401 and a functional structure of a management device 403.

Here, a restriction on usage of the device in Example 3 will be described. FIG. 7 is a block diagram showing a functional structure of a device driver 410 which is installed on the terminal device 401 and a functional structure of the management device 403.

As shown in FIG. 7, the device driver 410 comprises a user information acquisition section 411, a user information comparison section 412, and a delete processing execution section 413. The management device 403 comprises a user information management section 431 and a user information transmission section 432.

The user information acquisition section 411 obtains user information indicating a usage-permitted user of the device 402 from the management device 403. The user information comparison section 412 obtains user information of the terminal device 401 in which the device driver 410 is installed and compares the user information obtained from the terminal device 401 with the user information obtained by the user information acquisition section 411. If it is found as a result of the comparison by the user information comparison section 412 that the user information obtained from the terminal device 401 is not contained in the user information obtained from the management device 403, the delete processing execution section 413 makes the terminal device 401 uninstall the device driver 410.

The user information management section 431 manages the user information on the user registered as the usage-permitted user of the device 402. In response to the request from the user information acquisition section 411 of the device driver 410, the user information transmission section 432 sends the user information managed by the user information management section 431 to the device driver 410.

Figure 8:
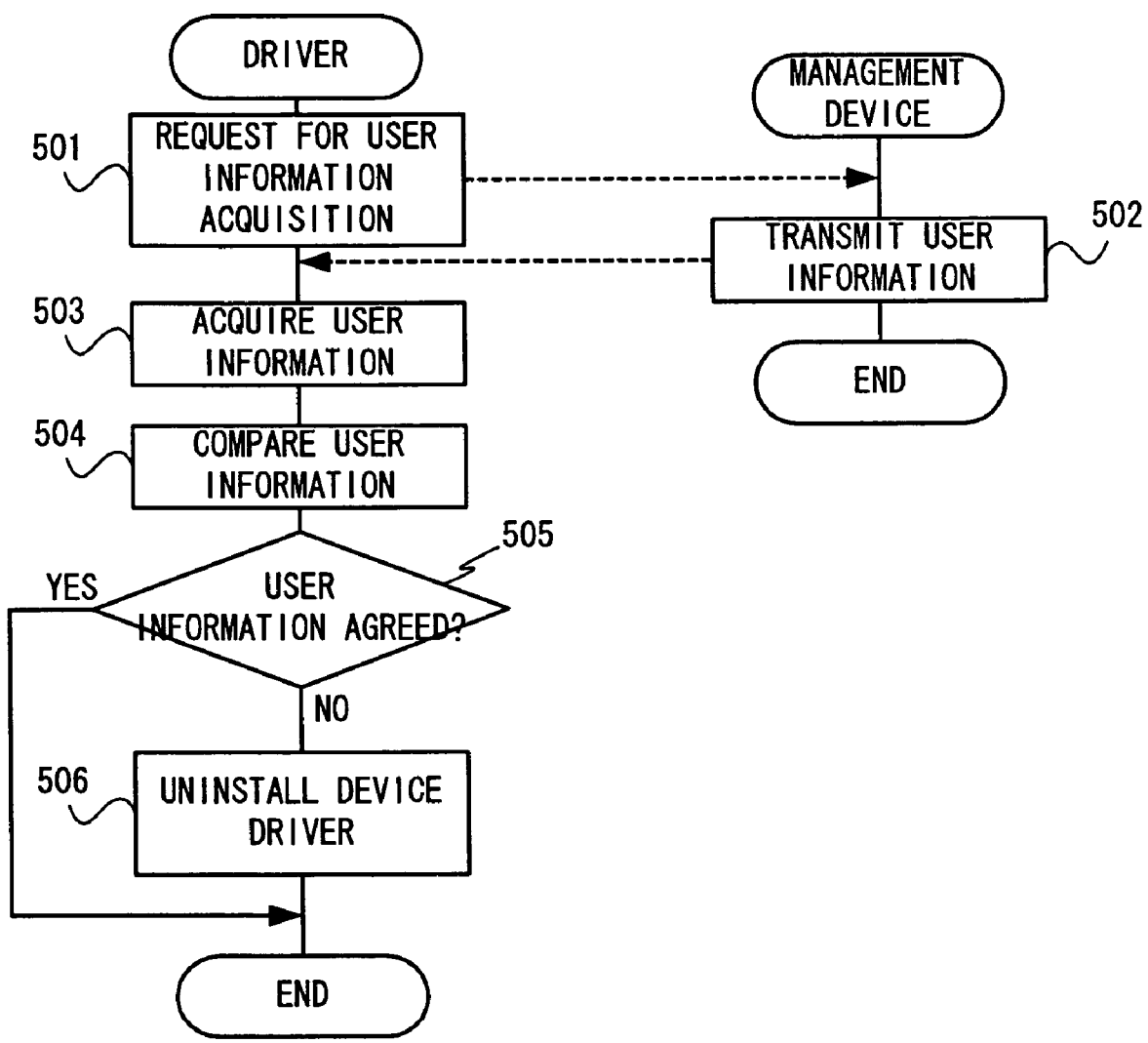
FIG. 8 is a flow chart showing a flow of management processing of the device driver in Example 3.

Then, management processing of the device driver configured as shown in FIG. 7 will be described. FIG. 8 is a flow chart showing a flow of the device driver management processing.

When activated, the device driver 410 sends a user information obtaining request to the management device 403 (step 501). The management device 403 responds to the obtaining request, the user information transmission section 432 sends user information (step 502), and the user information acquisition section 411 obtains the user information (step 503).

Subsequently, the user information comparison section 412 obtains the user information of the terminal device 401 in which the device driver 410 is installed and compares the user information obtained from the terminal device 401 with the user information obtained by the user information acquisition section 411 (step 504). When it is found as a result of the comparison that the user information obtained from the terminal device 401 agrees with any of the user information obtained from the management device 403 (YES in step 405), the device driver management processing is terminated without conducting any processing. But, when the user information obtained from the terminal device 401 does not agree with any of the user information obtained from the management device 403 (NO in step 405), the delete processing execution section 413 makes the terminal device 401 uninstall the device driver 410 (step 506) and terminates the device driver management processing.

EXAMPLE 4

Then, Example 4 will be described. The network of Example 4 has the same configuration as in Example 3 as shown in FIG. 6.

Figure 9:
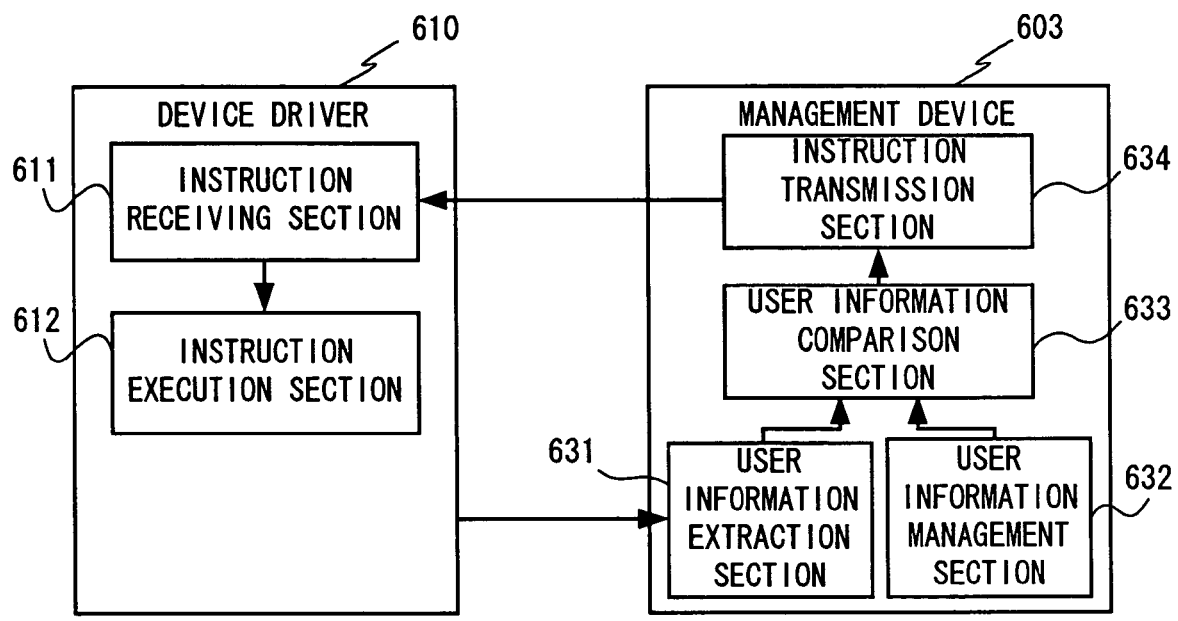
FIG. 9 is a block diagram showing a functional structure of a device driver 610 which is installed in a terminal device corresponding to the terminal device 401 and a functional structure of a management device 603 corresponding to the management device 403.

A restriction on usage of the device in Example 4 will be described. FIG. 9 is a block diagram showing a functional structure of a device driver 610 which is installed in a terminal device corresponding to the terminal device 401 and a functional structure of a management device 603 corresponding to the management device 403.

As shown in FIG. 9, the device driver 610 comprises an instruction receiving section 611 and an instruction execution section 612. The management device 603 comprises a user information extraction section 631, a user information management section 632, a user information comparison section 633 and an instruction transmission section 634.

The instruction receiving section 611 receives an instruction sent from the management device 603. The instruction execution section 612 executes the instruction received by the instruction receiving section 611. Specifically, the instruction receiving section 611 receives a delete instruction, which instructs uninstallation of the device driver 610, and the instruction execution section 612 makes a terminal device, in which the device driver 610 is installed, uninstall the device driver 610 according to the delete instruction.

The user information extraction section 631 monitors a job sent from the device driver 610 to the device 602 and extracts user information indicating the user of the terminal device in which the device driver 610 is installed. The user information management section 632 manages the user information on the user registered as the usage-permitted user of the device 602. The user information comparison section 633 compares the user information extracted by the user information extraction section 631 with the user information managed by the user information management section 632. If it is found as a result of the comparison made by the user information comparison section 632 that the user information extracted by the user information extraction section 631 is not contained in the user information managed by the user information management section 632, the instruction transmission section 634 sends a delete instruction instructing the uninstallation of the device driver 610 to the device driver 610.

Figure 10:
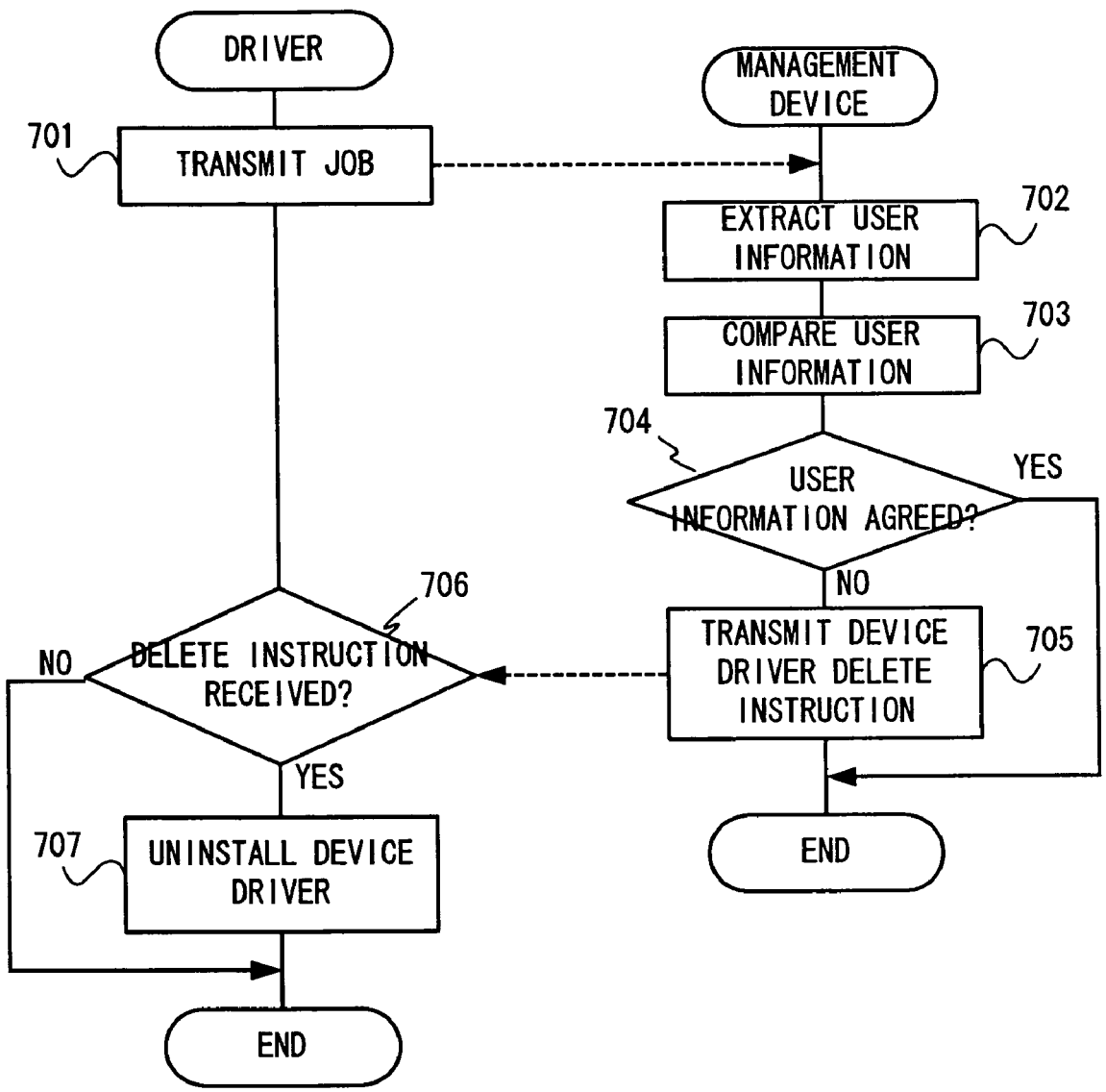
FIG. 10 is a flow chart showing a flow of management processing of the device driver in Example 4.

Then, management processing of the device driver configured as shown in FIG. 9 will be described. FIG. 10 is a flow chart showing a flow of the device driver management processing.

For example, when the device 602 is a printer, first, the device driver 610 generates a print job according to a print instruction from unshown application software or the like. When the generated job is sent to the device 602 (step 701), the user information extraction section 631 of the management device 603 monitors the job and extracts the user information indicating the user of the terminal device in which the device driver 610 is installed (step 702).

Subsequently, the user information comparison section 633 compares the user information extracted by the user information extraction section 631 with the user information managed by the user information management section 632 (step 703). If it is found as a result of the comparison that the user information extracted by the user information extraction section 631 agrees with any of the user information managed by the user information management section 632 (YES in step 704), the device driver management processing is terminated without conducting any processing. At this time, the device driver 610 does not receive any delete instruction (NO in step 706), so that the device driver 610 also terminates the device driver management processing without conducting any processing.

Meanwhile, if the user information extracted by the user information extraction section 631 does not agree with any of the user information managed by the user information management section 632 (NO in step 704), the instruction transmission section 634 sends a delete instruction to the device driver 610 (step 705). When this delete instruction is received by the instruction receiving section 611 (YES in step 706), the instruction execution section 612 makes the terminal device in which the device driver 610 is installed uninstall the device driver 610 (step 707) and terminates the device driver management processing.

EXAMPLE 5

Figure 11:
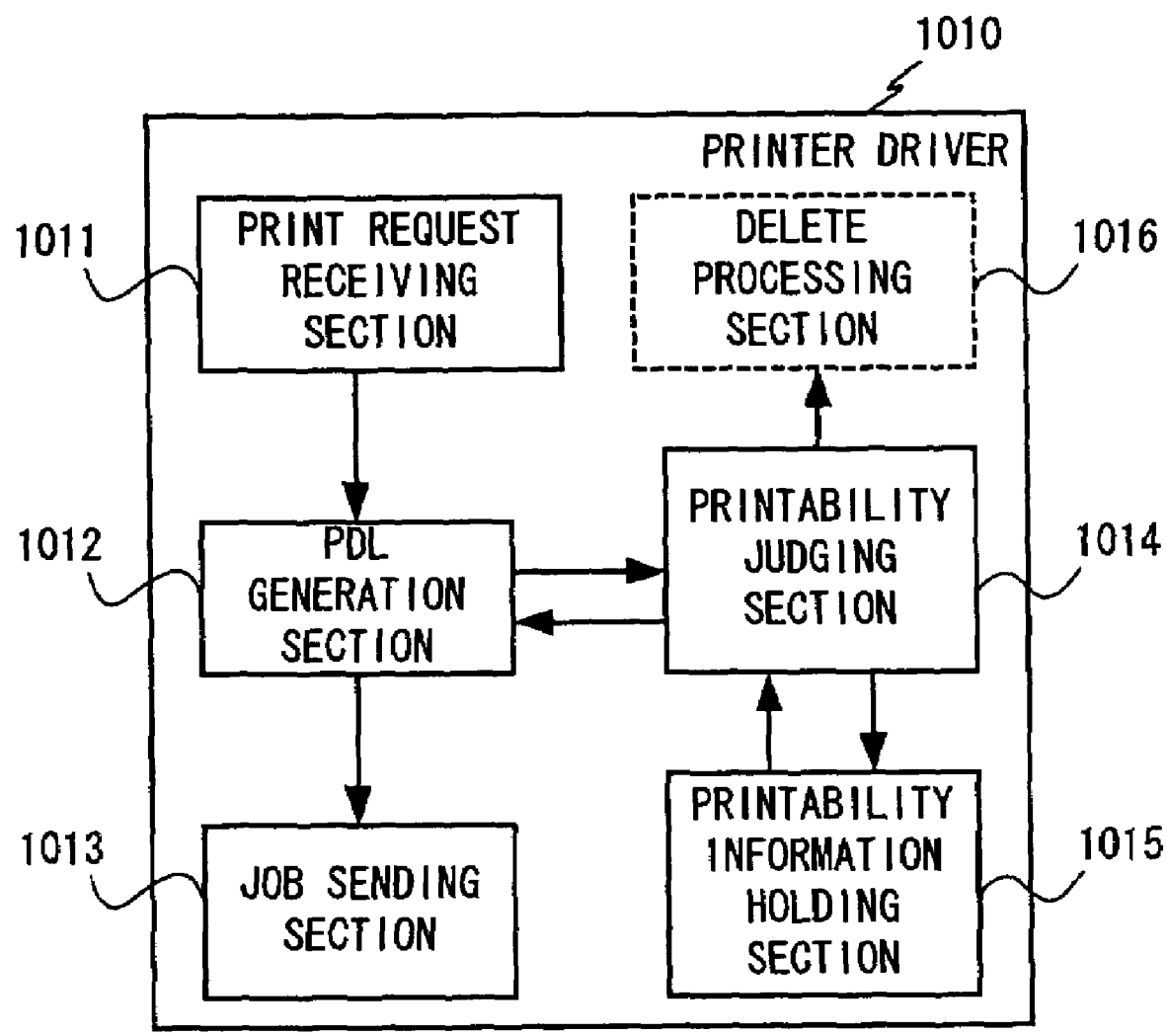
FIG. 11 is a block diagram showing a functional structure of the printer driver in Example 5.

Example 5 is an example of applying the present invention to a device driver. Here, a printer driver will be described as an example. FIG. 11 is a block diagram showing a functional structure of the printer driver in Example 5.

As shown in FIG. 11, a printer driver 1010 comprises a print request receiving section 1011, a PDL generation section 1012, a job sending section 1013, a printability judging section 1014, a printability information holding section 1015, and a delete processing section 1016. The printer driver 1010 is actually software running on a PC (personal computer) and realized by installing a program for realizing the printer driver in the PC or the like and running the program by the PC or the like.

The print request receiving section 1011 receives a print request from application software or the like, which runs on a PC or the like having the printer driver 1010 installed. The PDL generation section 1012 generates a PDL (page description language) according to document data or the like given from the application software or the like. The job sending section 1013 sends a print job containing the PDL generated by the PDL generation section 1012 to an unshown printer. The PC or the like in which the printer driver 1010 is installed and the printer may be connected over a network or may be local-connected by a parallel cable or a serial cable.

The printability judging section 1014 uses the printer driver 1010 to judge printability, namely job sendability by the printer driver 1010. This printability is judged according to a counter value held by the printability information holding section 1015. The printability information holding section 1015 holds the counter value as printability information. The counter value is determined to be a predetermined value at the time of installation of the printer driver and later reduced depending on the number of pages requested to be printed. The printability information holding section 1015 is not always configured as part of the printer driver 1010 but may be configured within a storage device of the PC or the like in which the printer driver 1010 is installed.

When the printability judging section 1014 judges that it is impossible to use the printer driver 1010 for printing, the delete processing section 1016 uninstalls the printer driver 1010. But, the delete processing section 1016 is not always a required component.

Figure 12:
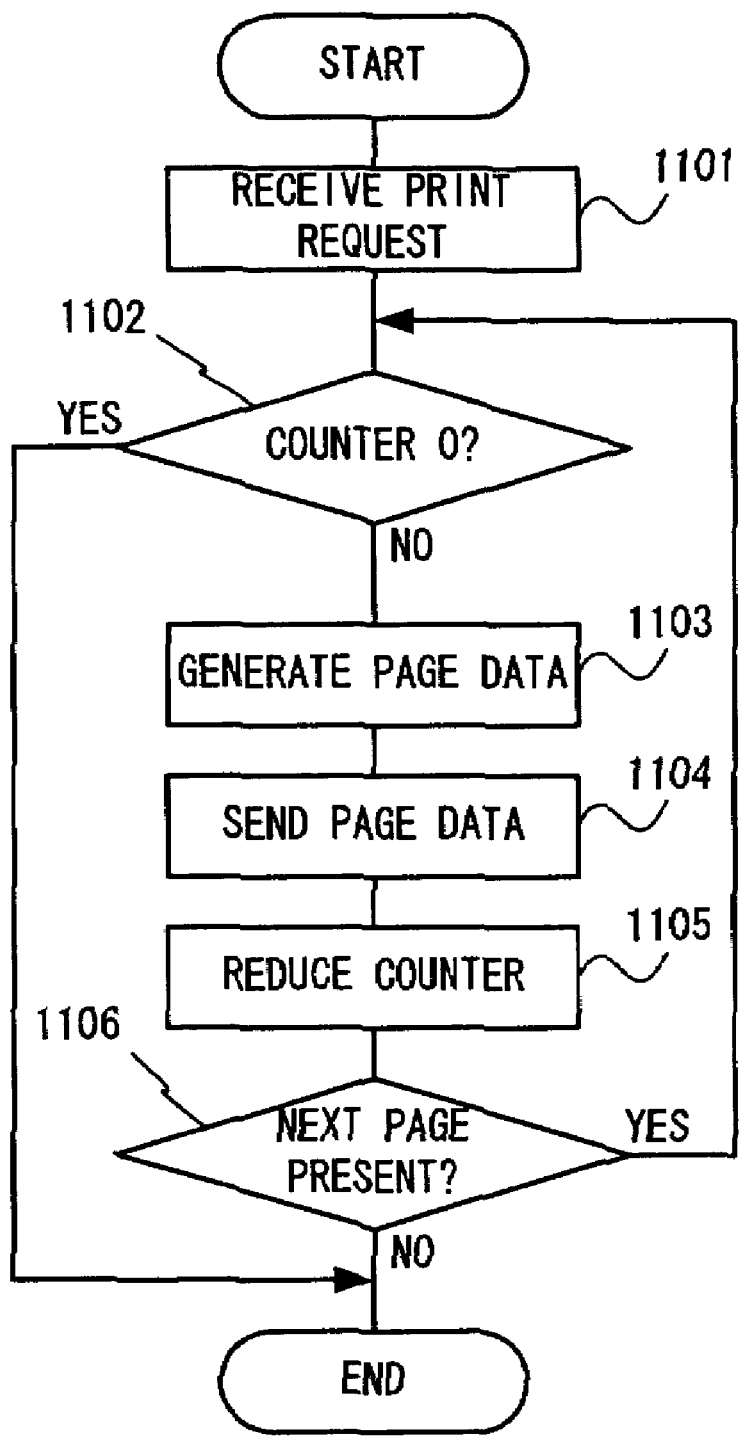
FIG. 12 is a flow chart showing a flow of an operation of a printer driver 1010.

Then, an operation of the printer driver 1010 will be described. First, the operation of a case that the printer driver 1010 does not have the delete processing section 1016 will be described. FIG. 12 is a flow chart showing a flow of the operation of the printer driver 1010.

The printer driver 1010 is activated when a print request is generated from an application or the like of the PC or the like in which the printer driver 1010 is installed, and the print request receiving section 1011 accepts the print request (step 1101). When the print request receiving section 1011 accepts the print request, the PDL generation section 1012 generates a PDL according to the print request, but the PDL generation section 1012 makes the printability judging section 1014 judge printability before the generation of the PDL. If the counter value held by the printability information holding section 1015 is not zero (NO in step 1102), the printability judging section 1014 notifies the PDL generation section 12 that printing can be made, and the PDL generation section 1012 generates page data according to the notice (step 1103). And, when the generated page data is sent to the unshown printer by the job sending section 1013 (step 1104), the PDL generation section 1012 notifies it to the printability judging section 1014, and the printability judging section 1014 subtracts 1 from the counter value held by the printability information holding section 1015 (step 1105). Then, if there is a next page (YES in step 1106), the process returns back to the step 1102, and the PDL generation section 1012 repeats the same processing, but if there is no next page (NO in step 1106), the printer driver 1010 terminates the processing.

Meanwhile, if the counter value held by the printability information holding section 1015 is zero (YES in step 1102), the printability judging section 1014 notifies the PDL generation section 1012 that printing cannot be made, and the PDL generation section 1012 having received it stops the print processing, and the printer driver 1010 terminates the processing.

Figure 13:
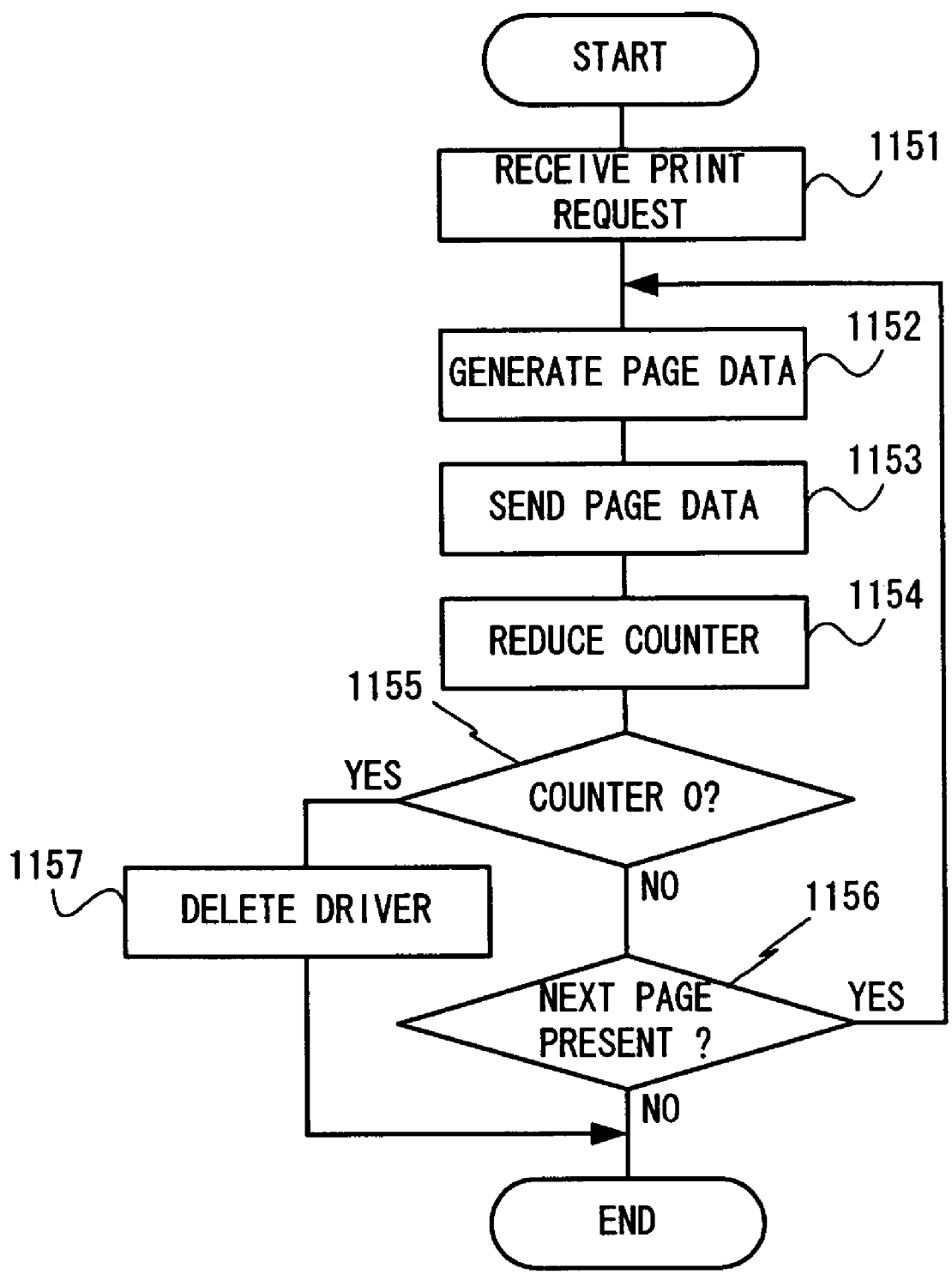
FIG. 13 is a flow chart showing a flow of an operation of the printer driver 1010 when the printer driver 1010 has a delete processing section 1016.

Then, an operation when the printer driver 1010 has the delete processing section 1016 will be described. FIG. 13 is a flow chart showing a flow of the operation of the printer driver 1010 when the printer driver 1010 has the delete processing section 1016.

The printer driver 1010 is activated when a print request is generated from an application or the like of the PC or the like in which the printer driver 1010 is installed, and the print request receiving section 1011 receives the print request (step 1151). When the print request receiving section 1011 receives the print request, the PDL generation section 1012 generates a PDL according to the print request and generates first page data (step 1152). When the generated page data is sent to the unshown printer by the job sending section 1013 (step 1153), the PDL generation section 1012 notifies it to the printability judging section 1014, and the printability judging section 1014 subtracts 1 from the counter value held by the printability information holding section 1015 (step 1154).

As a result, if the counter value held by the printability information holding section 1015 does not become zero (NO in step 1155) and there is a next page (YES in step 1156), the process returns to the step 1152, and the same processing is repeated, but if there is no next page (NO in step 1156), the printer driver 1010 terminates the processing.

Meanwhile, if the subtraction of 1 by the printability judging section 1014 from the counter value held by the printability information holding section 1015 results in that the counter value held by the printability information holding section 1015 becomes zero (YES in step 1155), the delete processing section 1016 uninstalls the printer driver 1010 (step 1157), and the printer driver 1010 terminates the processing.

Here, the delete processing section 1016 has an arbitrary structure, but when the printer driver 1010 does not have the delete processing section 1016, a tool or the like for changing the counter value held by the printability information holding section 1015 to a predetermined value is separately generated, and the generated tool can be used to reuse the printer driver 1010.

At the time of the print processing by the printer driver 1010, processing for verification or the like is not particularly performed, but verification is considered unnecessary in a case where, for example, it is temporarily used at an event hole or the like or where a PC in which the printer driver 1010 is previously installed is rented to a user.

EXAMPLE 6

Example 6 is an example of applying the present invention to a printer driver in the same manner as in Example 5 except that printing is limited according to not the number of pages but the number of issued jobs. In Example 6, the printer driver is configured in the same way as in Example 5, so that its operation only will be described. The operation will be described with reference to FIG. 11 if necessary.

Figure 14:
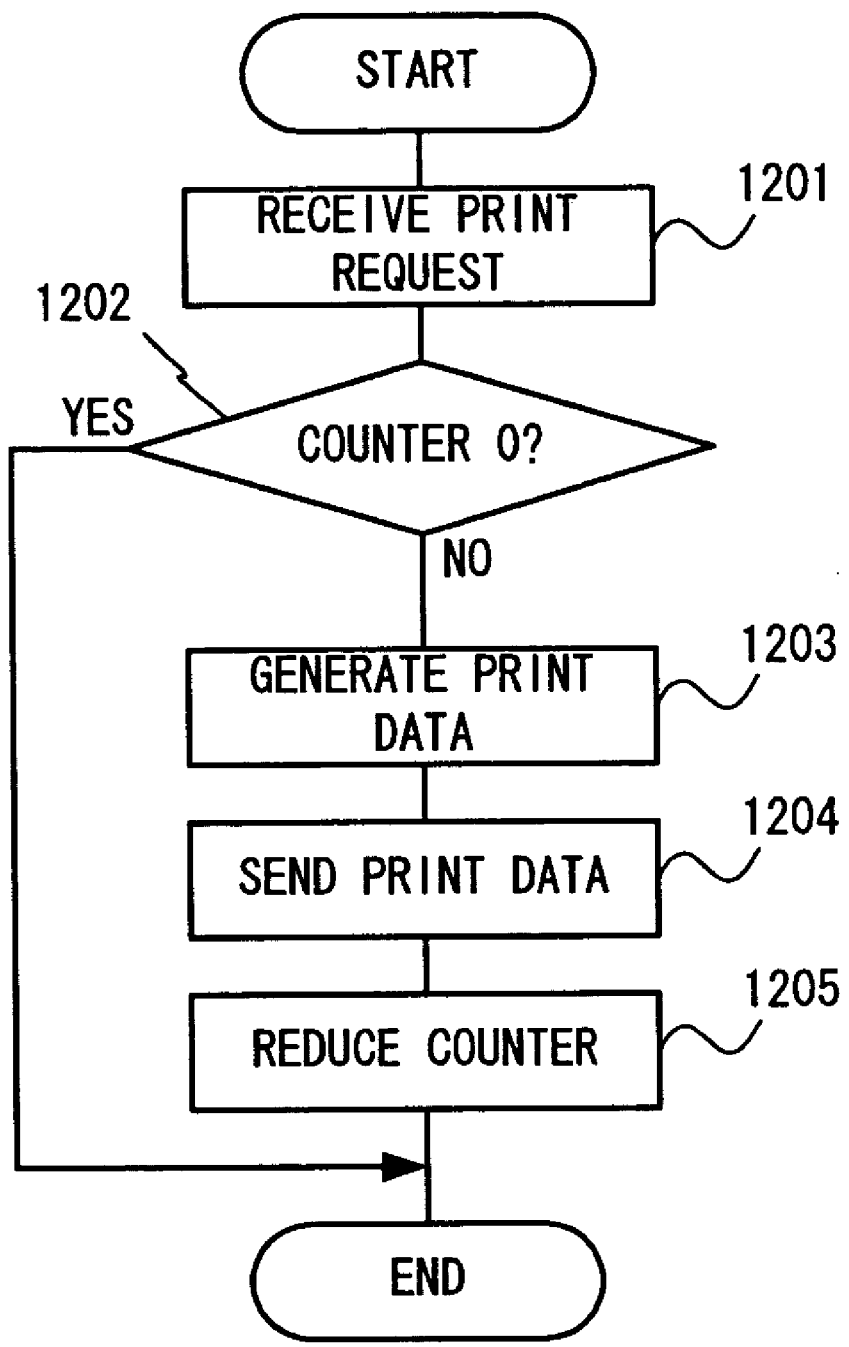
FIG. 14 is a flow chart showing a flow of an operation of the printer driver 1010 in Example 6.

First, an operation when the printer driver 1010 does not have the delete processing section 1016 will be described. FIG. 14 is a flow chart showing a flow of the operation of the printer driver 1010 in Example 6.

The printer driver 1010 is activated when a print request is generated from an application or the like of a PC or the like in which the printer driver 1010 is installed, and the print request receiving section 1011 receives the print request (step 1201). When the print request receiving section 1011 receives the print request, the PDL generation section 1012 generates a PDL according to the print request. The PDL generation section 1012 makes the printability judging section 1014 judge printability before the generation of the PDL. When the counter value held by the printability information holding section 1015 is not zero (NO in step 1202), the printability judging section 1014 notifies the PDL generation section 1012 that printing is possible, and the PDL generation section 1012 generates print data of all pages accordingly (step 1203). And, the generated print data is sent by the job sending section 1013 to the unshown printer (step 1204), the PDL generation section 1012 notifies it to the printability judging section 1014, which subtracts 1 from the counter value held by the printability information holding section 1015 (step 1205), and the printer driver 1010 terminates the processing.

Meanwhile, if the counter value held by the printability information holding section 1015 is zero (YES in step 1202), the printability judging section 1014 notifies the PDL generation section 1012 that printing is impossible. The PDL generation section 1012 having received it stops the print processing, and the printer driver 1010 terminates the processing.

Figure 15:
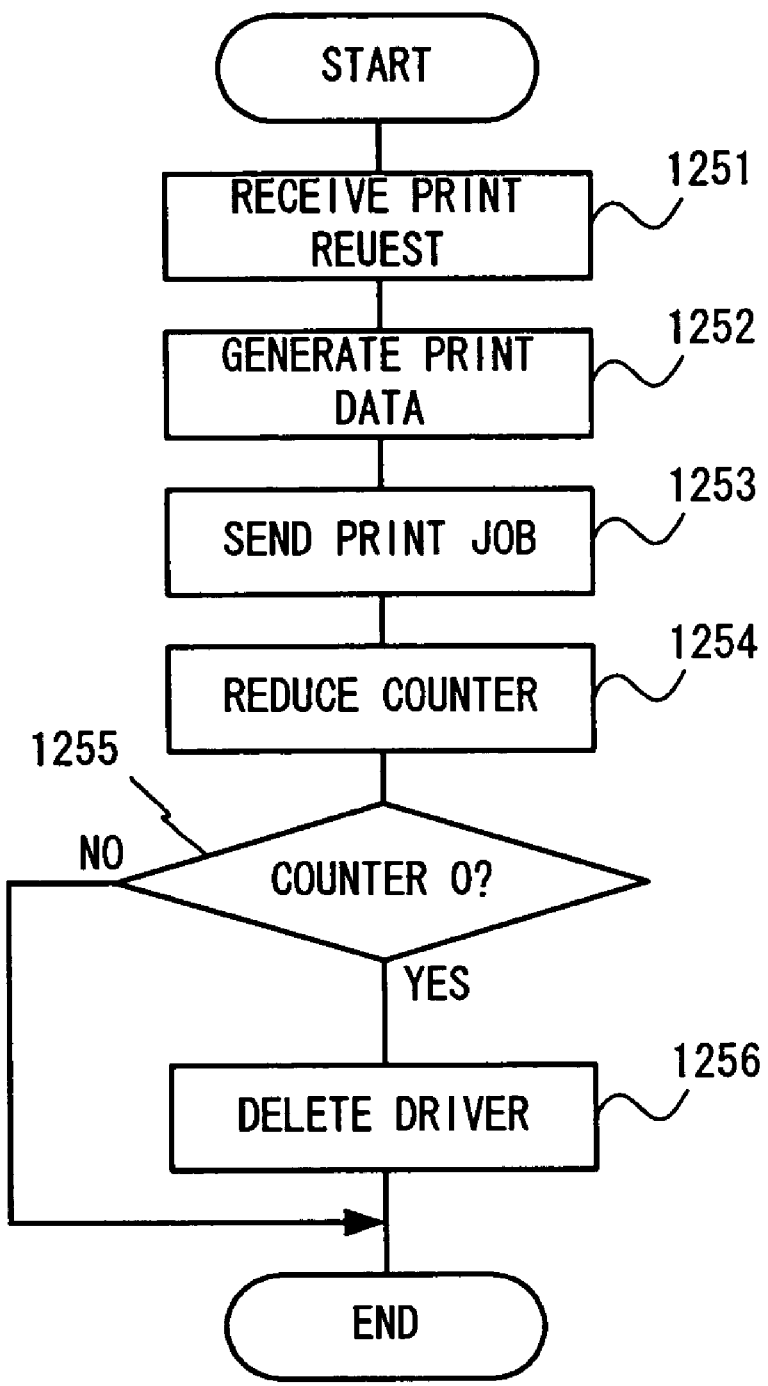
FIG. 15 is a flow chart showing a flow of an operation of the printer driver 1010 in Example 6 when the printer driver 1010 has the delete processing section 1016.

Then, an operation when the printer driver 1010 has the delete processing section 1016 will be described. FIG. 15 is a flow chart showing a flow of the operation of the printer driver 1010 in Example 6 where the printer driver 1010 has the delete processing section 1016.

The printer driver 1010 is activated when a print request is generated from an application or the like of a PC or the like in which the printer driver 1010 is installed, and the print request receiving section 1011 receives the print request (step 1251). When the print request receiving section 1011 receives the print request, the PDL generation section 1012 generates print data of all pages according to the print request (step 1252). And, the generated print data is sent by the job sending section 1013 to the unshown printer (step 1253), the PDL generation section 1012 notifies it to the printability judging section 1014, and the printability judging section 1014 subtracts 1 from the counter value held by the printability information holding section 1015 (step 1254).

As a result, if the counter value held by the printability information holding section 1015 does not become zero (NO in step 1255), the printer driver 1010 terminates the processing, but if the counter value held by the printability information holding section 1015 becomes zero (YES in step 1255), the delete processing section 1016 uninstalls the printer driver 1010 (step 1256), and the printer driver 1010 terminates the processing.

Here, the delete processing section 1016 has an arbitrary structure, but when the printer driver 1010 does not have the delete processing section 1016, a tool or the like for changing the counter value held by the printability information holding section 1015 to a prescribed value is separately generated, and the generated tool can be used to reuse the printer driver 1010.

EXAMPLE 7

Figure 16:
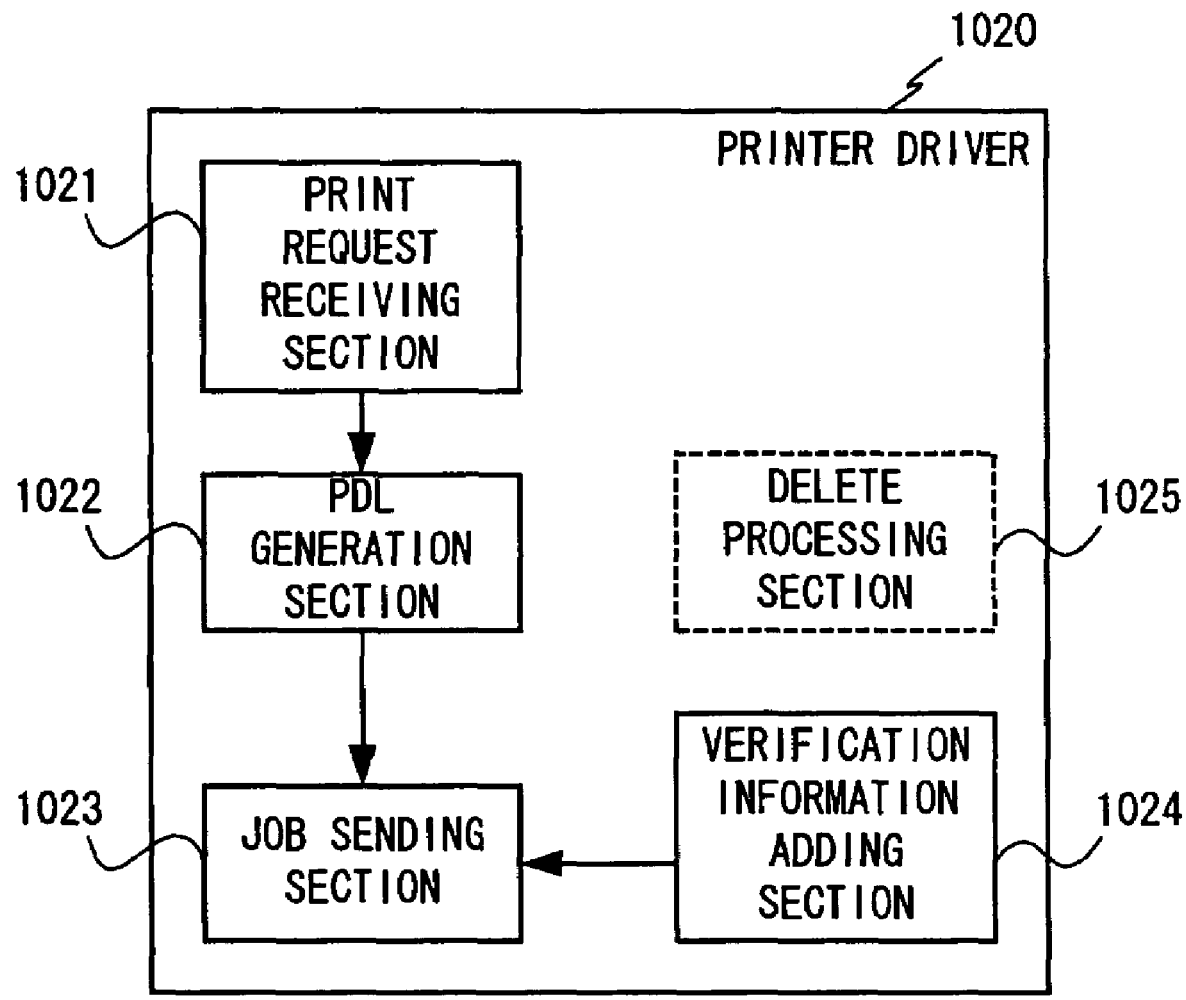
FIG. 16 is a block diagram showing a functional structure of the printer driver in Example 7.

Example 7 is an example of applying the present invention to a device, and a printer will be described as an example. FIG. 16 is a block diagram showing a functional structure of the printer driver in Example 7, and FIG. 17 is a block diagram showing a functional structure of the printer in Example 7.

As shown in FIG. 16, a printer driver 1020 comprises a print request receiving section 1021, a PDL generation section 1022, a job sending section 1023, a verification information adding section 1024, and a delete processing section 1025. The printer driver 1020 is actually software running on a PC (personal computer) or the like and realized by installing a program for realizing the printer driver in the PC or the like and running the program on the PC or the like.

The print request receiving section 1021 receives a print request from application software or the like running on the PC or the like in which the printer driver 1020 is installed. The PDL generation section 1022 generates a PDL (page description language) according to document data or the like given from the application software or the like. The job sending section 1023 sends a print job containing the PDL generated by the PDL generation section 1022 to a printer 1030 shown in FIG. 17. The verification information adding section 1024 adds verification information to the job sent by the job sending section 1023. When the printer 1030 rejects the processing of the job sent by the job sending section 1023, the delete processing section 1025 uninstalls the printer driver 1020. But, the delete processing section 1025 is not always a necessary component. When the printer driver 1020 does not have the delete processing section 1025, it has the same structure as that of a conventional printer driver that verification information can be added to the job.

Figure 17:
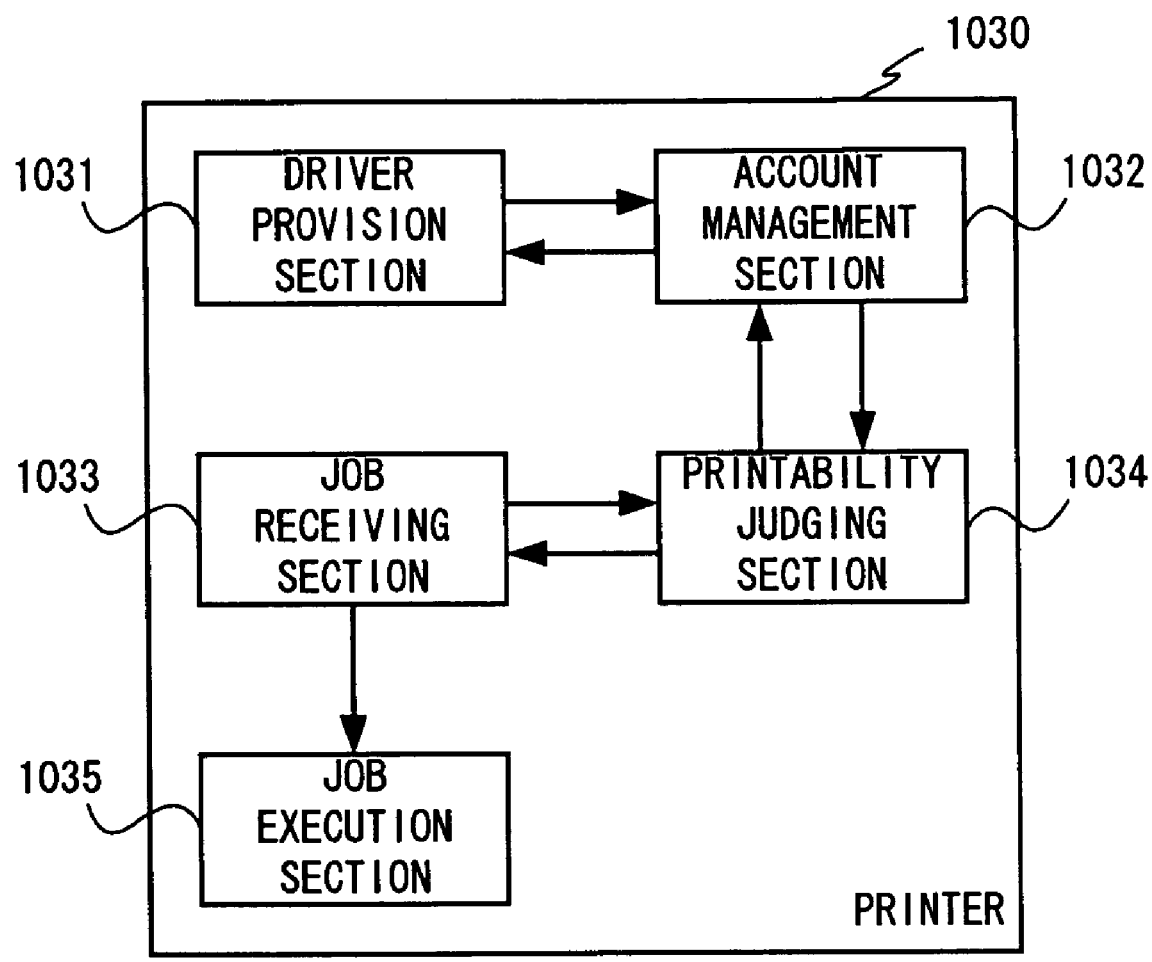
FIG. 17 is a block diagram showing a functional structure of the printer in Example 7.

As shown in FIG. 17, the printer 1030 comprises a driver provision section 1031, an account management section 1032, a job receiving section 1033, a printability judging section 1034 and a job execution section 1035.

The driver provision section 1031 provides a PC or the like, which uses the printer 1030, with the printer driver 1020 and operates as a Web server for example. The account management section 1032 manages the account of each printer driver 1020 (also user) identified according to the verification information added by the verification information adding section 1024 of the printer driver 1020 and manages the number of printed sheets or the number of job executions usable by the printer driver 1020. The job receiving section 1033 receives the job sent by the job sending section 1023 of the printer driver 1020. The printability judging section 1034 judges executability of the job received by the job receiving section 1033 according to the account managed by the account management section 1032. The job execution section 1025 executes a job, which is judged executable by the printability judging section 1034, among the jobs received by the job receiving section 1033 and forms an image on a sheet or the like.

Figure 18:
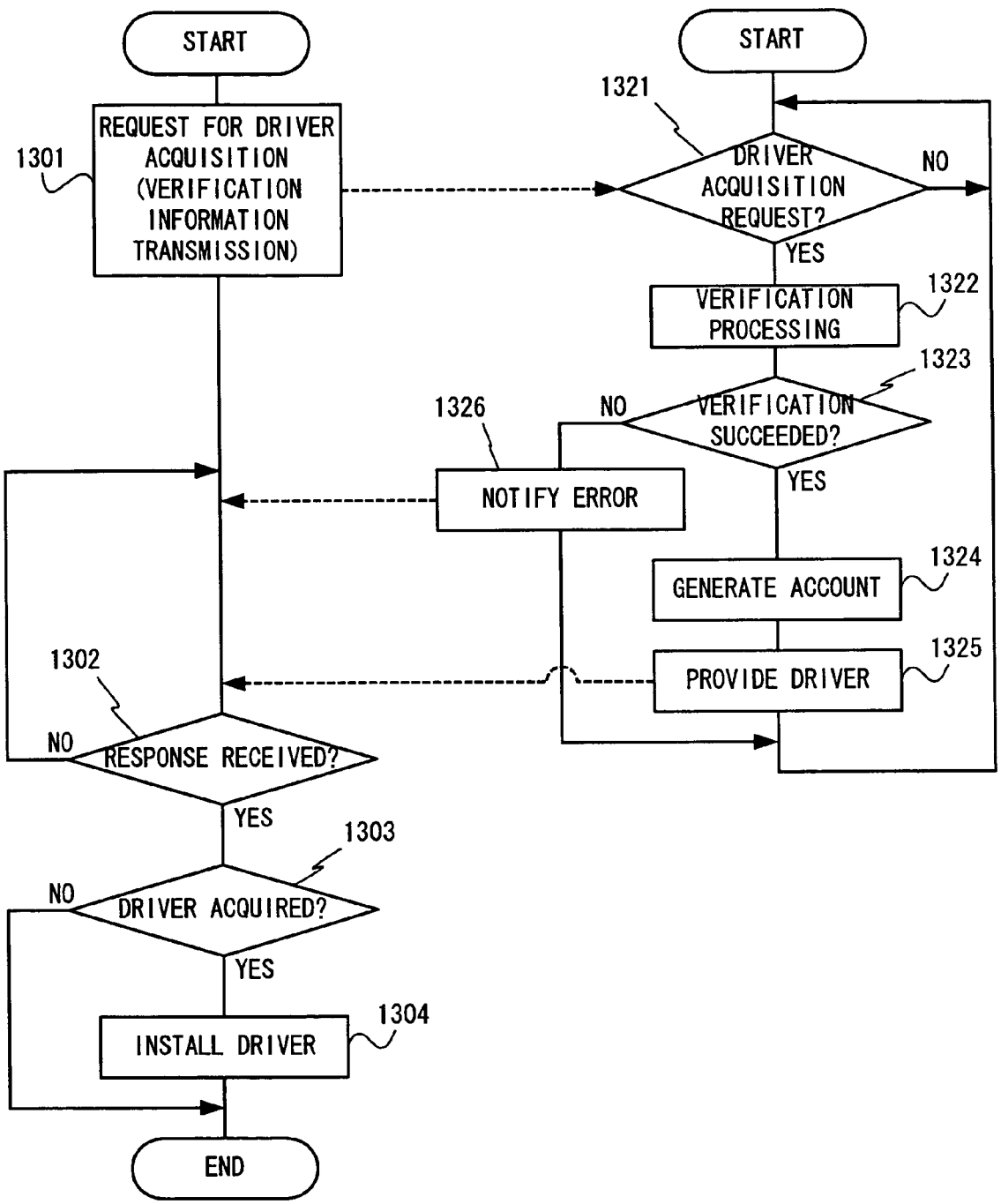
FIG. 18 is a flow chart showing a flow of processing to provide a printer driver 1020 by a printer 1030.

Then, operations of the printer driver 1020 and the printer 1030 will be described. First, an operation to provide the printer driver 1020 by the printer 1030 will be described. FIG. 18 is a flow chart showing a flow of the processing to provide the printer driver 1020 by the printer 1030.

First, a user uses a Web browser from a PC or the like in which the printer driver 1020 is desired to be installed to access the printer 1030 to make a driver acquisition request (step 1301). At this time, the user notifies the printer 1030 of verification information such as a previously issued ID, password or the like according to the instruction from the printer 1030.

Meanwhile, when the driver provision section 1031 receives a driver acquisition request from the PC or the like (YES in step 1321), the printer 1030 performs verification processing according to the verification information notified by the Web browser of the PC or the like (step 1322). As a result, if verification is successive (YES in step 1323), the account management section 1032 generates an account according to the verification information (step 1324), and the driver provision section 1031 provides the printer driver 1020 (step 1325). If the verification processing results in a failure of verification (NO in step 1323), the driver provision section 1031 notifies the Web browser of the PC or the like of an error (step 1326).

If there is a response from the printer 1030 (YES in step 1302), and when the PC or the like can obtain the printer driver 1020 (YES in step 1303), it installs the obtained printer driver 1020 in the PC or the like (step 1304). If the printer driver 1020 cannot be obtained, it means an error, so that the processing is terminated.

Figure 19:
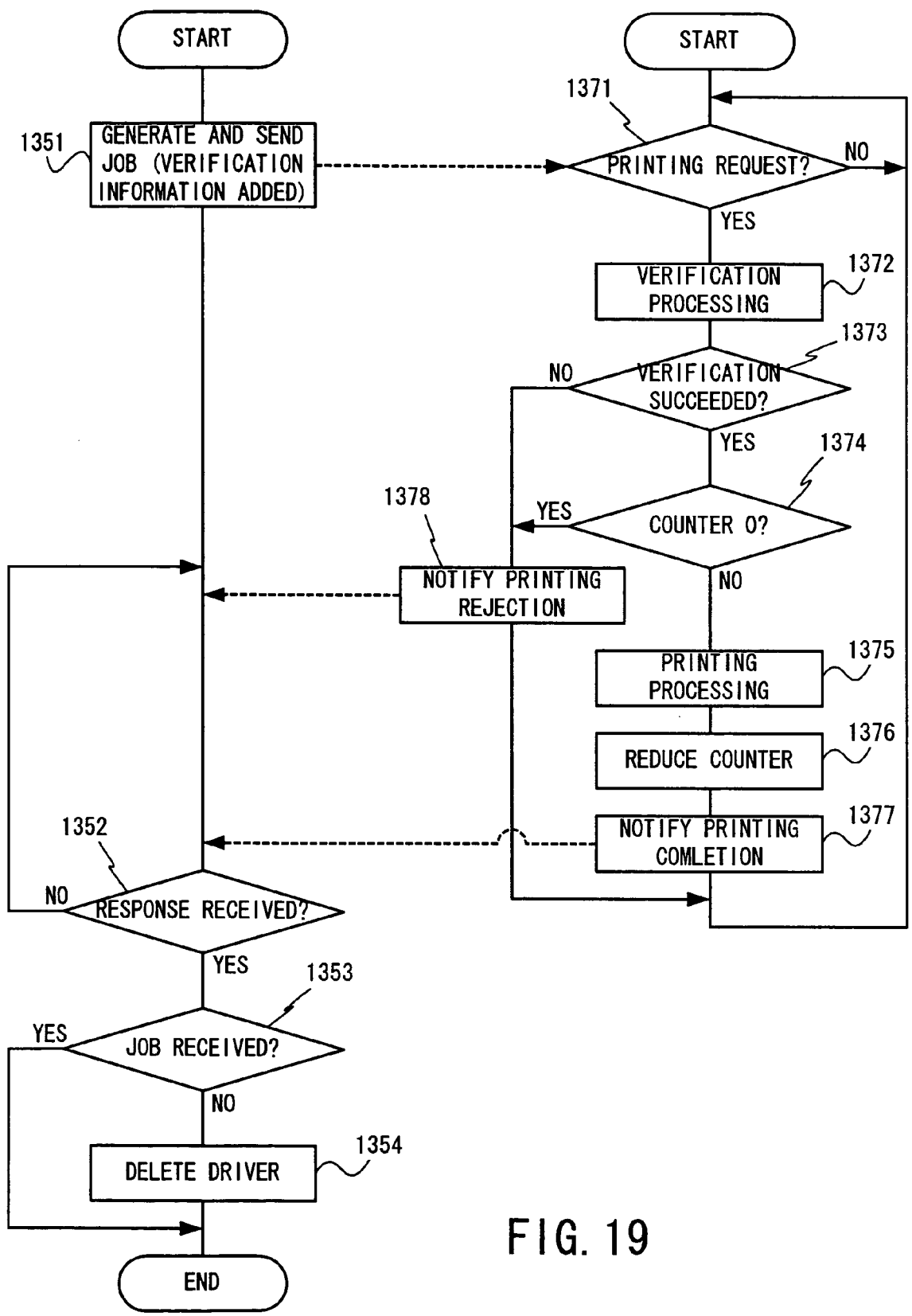
FIG. 19 is a flow chart showing a flow of print processing by the printer driver 1020 and the printer 1030.

Subsequently, operations of the printer driver 1020 and the printer 1030 at the time of a print request will be described. FIG. 19 is a flow chart showing a flow of print processing by the printer driver 1020 and the printer 1030. Here, it is described that the printer 1030 judges the printability of the job from the printer driver 1020 according to the number of job executions, but printability may be judged according to the number of printed pages in the same manner as in Example 6.

The printer driver 1020 is activated when a print request is generated from an application or the like of a PC or the like in which the printer driver 1020 is installed, and when the print request receiving section 1021 receives the print request, the PDL generation section 1022 generates a PDL according to the print request, and the job sending section 1023 sends a job, which includes the generated PDL and has verification information added by the verification information adding section 1024, to the printer 1030 (step 1351). At this time, the verification information added by the verification information adding section 1024 is the verification information used at the time of obtaining the printer driver 1020.

Meanwhile, when the job receiving section 1033 in the printer 1030 receives as a print request the job sent from the printer driver 1020 (YES in step 1371), the printability judging section 1034 performs verification processing according to verification information contained in the job and an account managed by the account management section 1032 (step 1372). When the authentication verification processing confirms the identity (YES in step 1373), and if the counter value of the account managed by the account management section 1032 is not zero (NO in step 1374), the printability judging section 1034 allows the job receiving section 1033 to execute the job, and the job receiving section 1033 makes the job execution section 1035 execute the job, namely the print processing (step 1375). When the print processing is completed, the job receiving section 1033 notifies it to the printability judging section 1034, and the printability judging section 1034 subtracts 1 from the counter value of the account managed by the account management section 1032 (step 1376). The job receiving section 1033 notifies the completion of printing to the printer driver 1020 (step 1377).

And, when the counter value of the account managed by the account management section 1032 is zero (YES in step 1374) or the verification fails (NO in step 1373), the printability judging section 1034 notifies the job receiving section 1033 that the job cannot be executed, and the job receiving section 1033 having received it sends a print rejection notice to the printer driver 1020 (step 1378).

When the printer driver 1020 receives a response from the printer 1030 (YES in step 1352) and the response is a notice of the completion of printing (YES in step 1353), the processing is terminated, but when the response is a print rejection notice (NO in step 1353), the delete processing section 1025 uninstalls the printer driver 1020 (step 1354) and terminates the processing. When the printer driver 1020 does not have the driver delete processing section 1025, the processing is terminated when the response from the printer 1030 is received.

In the above-described operation example, if the job is unexecutable, the printer 1030 notifies the print rejection (step 1378) but may notify a driver deletion instruction to the printer driver 1020 instead of the print rejection notice. Where the driver deletion instruction is notified, if the counter value becomes zero when the counter was subtracted in the processing of step 1376, the driver deletion instruction can be issued at that time.

As described above, the printer 1030 can judge printability not according to the number of job executions but the number of printed pages, but if the number of PDL pages contained in the job is larger than the number of printable pages, it is possible to make setting so that the job execution is rejected or the number of printable pages only is printed.

Here, the delete processing section 1025 has an arbitrary configuration, but if the printer driver 1020 does not have the delete processing section 1025, the printer driver 1020 can be reused by changing the counter value of the account managed by the account management section 1032 of the printer 1030 to a prescribed value.

EXAMPLE 8

Example 8 is an example of applying the present invention to a device, and a printer will be described as an example.

Figure 20:
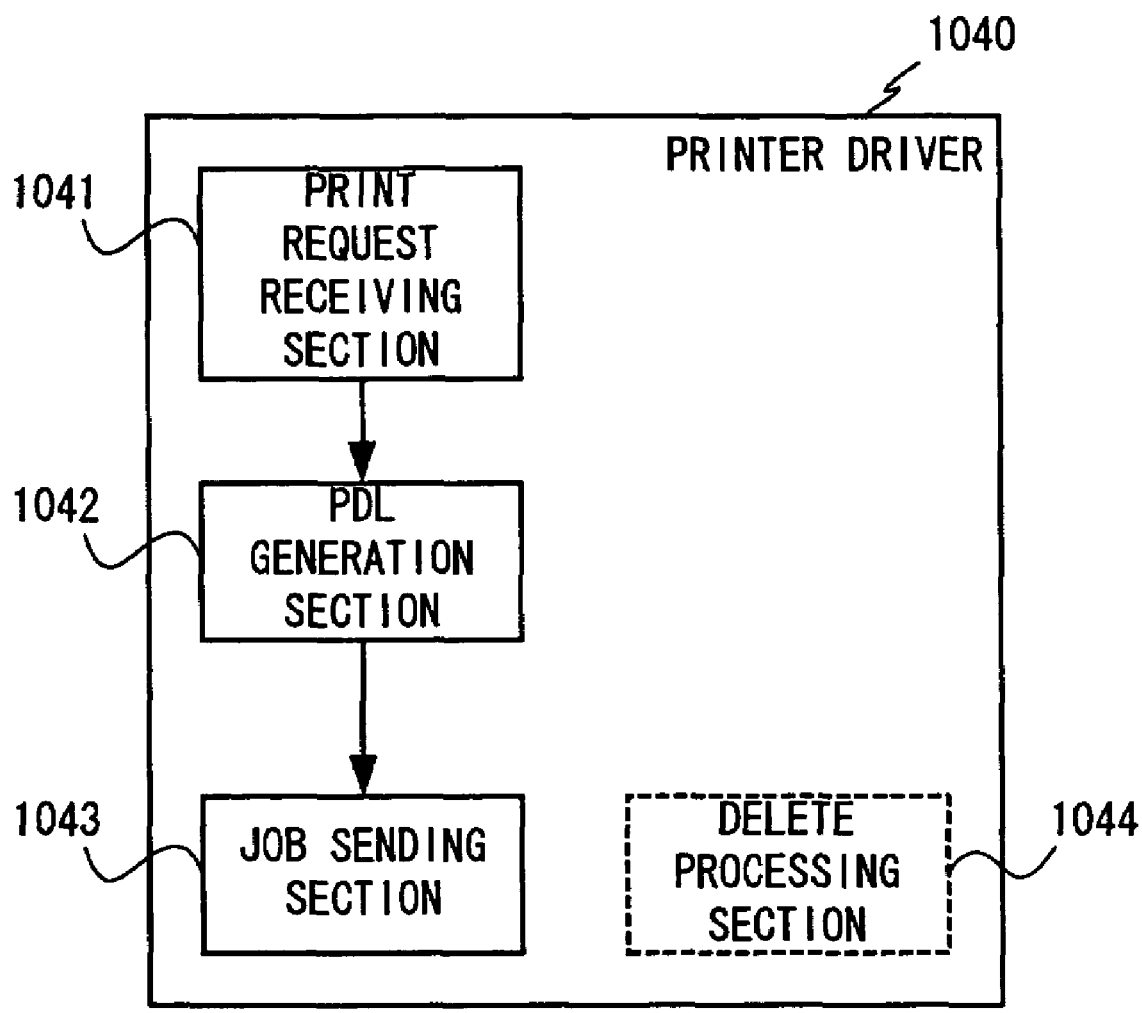
FIG. 20 is a block diagram showing a functional structure of the printer driver in Example 8.
Figure 21:
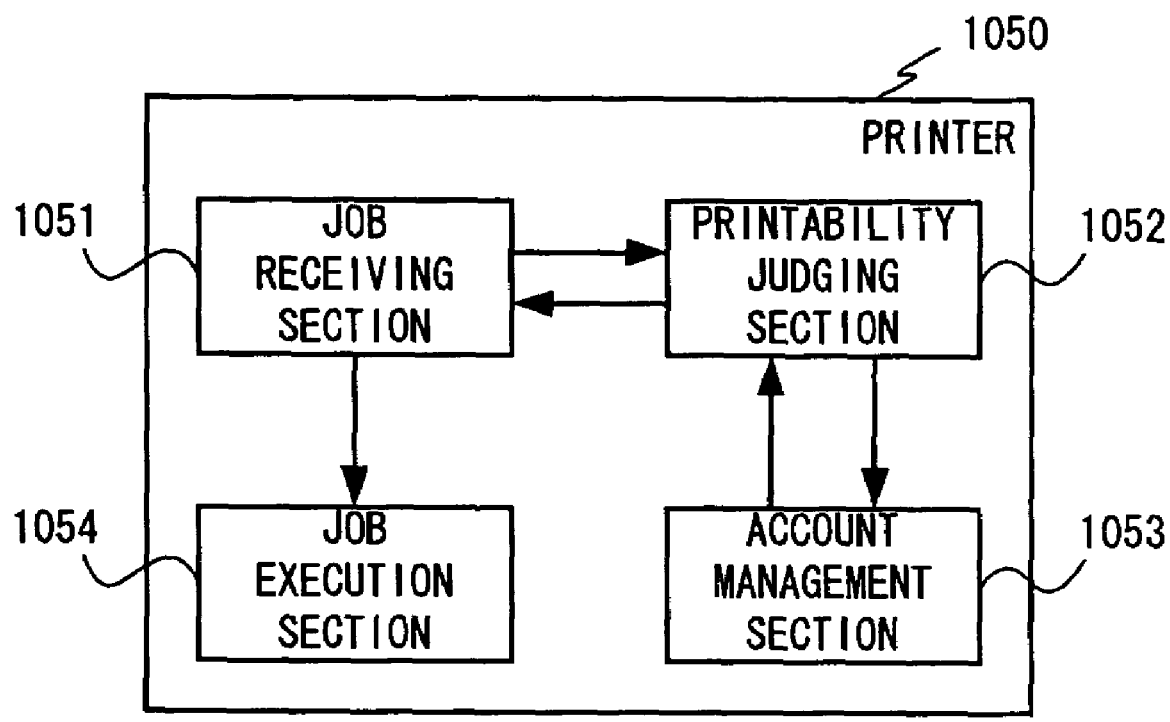
FIG. 21 is a block diagram showing a functional structure of the printer in Example 8.

FIG. 20 is a block diagram showing a functional structure of the printer driver in Example 8, and FIG. 21 is a block diagram showing a functional structure of the printer in Example 8.

As shown in FIG. 20, a printer driver 1040 comprises a print request receiving section 1041, a PDL generation section 1042, a job sending section 1043, and a delete processing section 1044. The printer driver 1040 is actually software which runs on a PC (personal computer) or the like and realized by installing a program for realizing the printer driver in the PC or the like and running the program by the PC or the like.

The print request receiving section 1041 receives a print request from application software or the like which runs on a PC or the like having the printer driver 1040 installed. The PDL generation section 1042 generates a PDL (page description language) according to document data or the like given from the application software or the like. The job sending section 1043 sends a print job containing the PDL generated by the PDL generation section 1042 to a printer 1050 shown in FIG. 21. When the printer 1050 rejects the processing of the job sent by the job sending section 1043, the delete processing section 1044 uninstalls the printer driver 1040. But, the delete processing section 1044 is not always a necessary component. When the printer driver 1040 does not have the delete processing section 1044, it has the same structure as that of a conventional printer driver.

As shown in FIG. 21, the printer 1050 comprises a job receiving section 1051, a printability judging section 1052, an account management section 1053 and a job execution section 1054.

The job receiving section 1051 receives the job sent by the job sending section 1043 of the printer driver 1040. The printability judging section 1052 judges executability of the job received by the job receiving section 1051 according to the account managed by the account management section 1053. The account management section 1053 manages identification information, e.g., the account of each MAC (Media Access Control) address of the network interface possessed by the PC or the like in which the printer driver 1040 is installed and manages the number of printed sheets or the number of job executions usable by each printer driver 1040. The job execution section 1054 executes a job, which is judged to be executable by the printability judging section 1052, among the jobs received by the job receiving section 1051 and forms an image on a sheet or the like.

Figure 22:
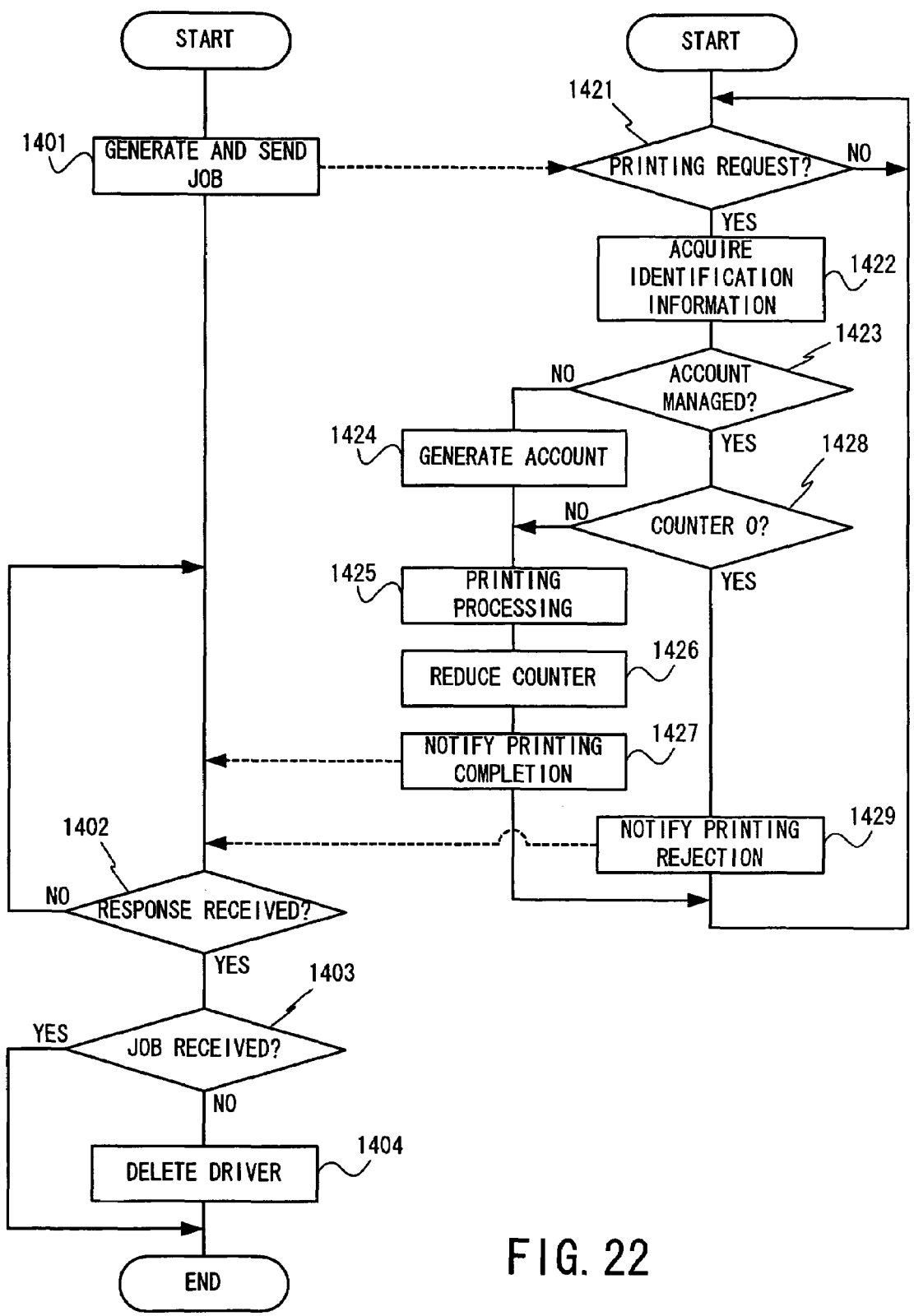
FIG. 22 is a flow chart showing a flow of print processing by a printer driver 1040 and a printer 1050.

Then, operations of the printer driver 1040 and the printer 1050 will be described. FIG. 22 is a flow chart showing a flow of print processing by the printer driver 1040 and the printer 1050. Here, the description will be made assuming that the printer 1050 judges the printability of the job from the printer driver 1040 according to the number of executed times of jobs. But, the printability can also be judged according to the number of printing pages in the same way as in Example 6.

The printer driver 1040 is activated when a print request is generated from an application or the like of a PC or the like in which the printer driver 1040 is installed, and when the print request receiving section 1041 receives the print request, the PDL generation section 1042 generates a PDL according to the print request, and the job sending section 1043 sends a job including the generated PDL to the printer 1050 (step 1401).

Meanwhile, when the job receiving section 1051 in the printer 1050 receives as a print request the job sent from the printer driver 1040 (YES in step 1421), the job receiving section 1051 obtains as identification information the MAC address of the network interface from the PC or the like which has sent the job (step 1422). Subsequently, the printability judging section 1052 checks whether an account corresponding to the obtained identification information is managed by the account management section 1053, and if not managed (NO in step 1423), the printability judging section 1052 generates an account corresponding to the obtained identification information and makes the account management section 1053 manage the account (step 1424). And, the printability judging section 1052 allows the job receiving section 1051 to execute the job, and the job receiving section 1052 makes the job execution section 1054 execute the job, namely the print processing (step 1425). When the print processing is completed, the job receiving section 1051 notifies it to the printability judging section 1052, and the printability judging section 1052 subtracts 1 from the counter value of the account managed by the account management section 1052 (step 1426). The job receiving section 1051 notifies the completion of printing to the printer driver 1040 (step 1427).

When the account corresponding to the obtained identification information is managed by the account management section 1053 (YES in step 1423), and if the counter value of the account managed by the account management section 1053 is not zero (NO in step 1428), the printability judging section 1052 allows the job receiving section 1051 to execute the job. And, the job receiving section 1051 makes the job execution section 1054 execute the job, namely the print processing (step 1425). When the print processing is completed, the job receiving section 1051 notifies it to the printability judging section 1052, and the printability judging section 1052 subtracts 1 from the counter value of the account managed by the account management section 1053 (step 1426). And, the job receiving section 1051 notifies the printer driver 1040 that the printing is completed (step 1427).

When the counter value of the account managed by the account management section 1053 is zero (YES in step 1428), the printability judging section 1052 notifies the job receiving section 1051 that the job cannot be executed, and the job receiving section 1051 having received it sends a print rejection notice to the printer driver 1040 (step 1429).

The printer driver 1040 having received the response from the printer 1050 (YES in step 1402) terminates the processing if the response is a print completion notice (YES in step 1403), but if the response is a print rejection notice (NO in step 1403), the delete processing section 1044 uninstalls the printer driver 1040 (step 1404) and terminates the processing. When the printer driver 1040 does not have the driver delete processing section 1044, it terminates the processing at the time of receiving the response from the printer 1040.

In the above-described operation example, if the job is unexecutable, the printer 1040 notifies the print rejection (step 1429) but may notify a driver deletion instruction to the printer driver 1040 instead of the print rejection notice. Where the driver deletion instruction is notified, if the counter value becomes zero when the counter was subtracted in the processing of step 1426, the driver deletion instruction can be issued at that time.

As described above, the printer 1050 can judge printability not according to the number of job executions but the number of printed pages, but if the number of PDL pages contained in the job is larger than the number of printable pages, it is possible to make setting so that job execution is rejected or the number of printable pages only is printed.

Here, the delete processing section 1044 has an arbitrary configuration, but if the printer driver 1040 does not have the delete processing section 1044, the printer driver 1040 can be reused by changing the counter value of the account managed by the account management section 1053 of the printer 1030 to a prescribed value.

What is claimed is:

1. A usage limiting method for a device executing a job generated by a driver, wherein:
    a driver corresponding to a device manages a usage state of the device, and when the usage state agrees with a predetermined condition, the driver stops generation of a job corresponding to the device, and
        the usage state is the number of jobs issued by the driver to the device, and when the number of jobs reaches a predetermined number, the driver stops the generation of the job corresponding to the device.

2. A usage limiting method for a device executing a job generated by a driver, wherein:
    a driver corresponding to a device manages a usage state of the device, and when the usage state agrees with a predetermined condition, the driver stops generation of a job corresponding to the device, and
        the generation of the job is stopped by deleting the driver.

3. A usage limiting method for a device executing a job generated by a driver, wherein the device manages a usage state of each driver for the device and, when the usage state agrees with a predetermined condition, the device rejects execution of a job sent from a corresponding driver, and
    the usage state is the number of jobs issued to the device by the individual drivers, and the device rejects execution of a job sent from a driver which has issued a predetermined number of jobs.

4. A usage limiting method for a device executing a job generated by a driver, wherein the device manages a usage state of each driver for the device and, when the usage state agrees with a predetermined condition, the device rejects execution of a job sent from a corresponding driver, and
    the device notifies a deletion instruction to the driver which has issued the job when the execution of the job is rejected, and the driver having received the deletion instruction deletes the driver itself.

5. A usage limiting method for a device executing a job generated by a driver, wherein a management device manages a usage state of each driver for a device, and when the usage state agrees with a predetermined condition, the management device deletes a corresponding driver from a terminal device in which the driver is installed, and
    the usage state is the number of jobs issued to the device by the individual drivers, and the management device deletes a driver which has issued a predetermined number of jobs from the terminal device in which the driver is installed.

6. A usage limiting method for a device executing a job generated by a driver, wherein a management device manages a usage state of each driver for a device, and when the usage state agrees with a predetermined condition, the management device deletes a corresponding driver from a terminal device in which the driver is installed, and
    the usage state is users of the driver, and when a user is not contained in user information on the users allowed to use the device, the management device deletes a corresponding driver from the terminal device in which the driver is installed.

7. A usage limiting method for a device executing a job generated by a driver, wherein a management device manages a usage state of each driver for a device, and when the usage state agrees with a predetermined condition, the management device deletes a corresponding driver from a terminal device in which the driver is installed, and
    the usage state is the number of pages printed by the device which is made to print by the individual drivers, and the management device deletes a driver which has issued a predetermined number of pages from the terminal device in which the driver is installed.

8. A usage limiting method for a device executing a job generated by a driver, wherein a management device manages a usage state of each driver for a device, and when the usage state agrees with a predetermined condition, the management device deletes a corresponding driver from a terminal device in which the driver is installed, and
    the driver is deleted by sending a driver deletion instruction to the terminal device.

9. A usage limiting apparatus for a device executing a job generated by a driver, comprising:
    a usage state management unit for managing a usage state of the device by the driver; and
    a job generation stop unit for stopping the generation of a job by the driver when the usage state managed by the usage state management unit agrees with a predetermined condition, wherein:
        the usage state is the number of jobs issued to the device by the driver; and
        the job generation stop unit stops the generation of a job by the driver when the number of jobs issued by the driver reaches a predetermined number.

10. A usage limiting apparatus for a device executing a job generated by a driver, comprising:
    a usage state management unit for managing a usage state of the device by the driver; and
    a job generation stop unit for stopping the generation of a job by the driver when the usage state managed by the usage state management unit agrees with a predetermined condition, wherein the job generation stop unit stops the generation of a job by the driver by deleting the driver.

11. A device that executes a job generated by a driver, the device comprising:

a usage state management unit for managing a usage state of the device of each driver of a plurality of drivers; and a job execution rejection unit for rejecting the execution of a job sent from a corresponding driver among the plurality of drivers when the usage state managed by the usage state management unit agrees with a predetermined condition, wherein:

the usage state is the number of jobs issued to the device by the individual drivers; and the job execution rejection unit rejects the execution of a job sent from the driver which has issued a predetermined number of jobs.

12. A device that executes a job generated by a driver, the device comprising:

a usage state management unit for managing a usage state of the device of each driver of a plurality of drivers; and a job execution rejection unit for rejecting the execution of a job sent from a corresponding driver among the plurality of drivers when the usage state managed by the usage state management unit agrees with a predetermined condition, wherein the job execution rejection unit notifies a deletion instruction to the driver which has issued the job when the execution of the job is rejected.

13. A usage limiting apparatus for a device executing a job generated by a driver, comprising:

a usage state management unit for managing a usage state of each driver to the device; and a driver delete unit for deleting a corresponding driver from a terminal device in which the driver is installed when the usage state managed by the usage state management unit agrees with a predetermined condition, wherein:

the usage state is the number of jobs issued to the device by the individual drivers; and the driver delete unit deletes the driver which has issued a predetermined number of jobs from the terminal device in which the driver is installed.

14. A usage limiting apparatus for a device executing a job generated by a driver, comprising:

a usage state management unit for managing a usage state of each driver to the device; and a driver delete unit for deleting a corresponding driver from a terminal device in which the driver is installed when the usage state managed by the usage state management unit agrees with a predetermined condition, wherein:

the usage state is users of the driver; and the driver delete unit deletes a corresponding driver from the terminal device in which the driver is installed when a user of the driver is not contained in user information on the users allowed to use the device.

15. A usage limiting apparatus for a device executing a job generated by a driver, comprising:

a usage state management unit for managing a usage state of each driver to the device; and a driver delete unit for deleting a corresponding driver from a terminal device in which the driver is installed when the usage state managed by the usage state management unit agrees with a predetermined condition, wherein:

the usage state is the number of pages printed by the device which is made to print by the individual drivers; and the driver delete unit deletes the driver which has issued a job for a predetermined number of pages from the terminal device in which the driver is installed.

16. A usage limiting apparatus for a device executing a job generated by a driver, comprising:

a usage state management unit for managing a usage state of each driver to the device; and a driver delete unit for deleting a corresponding driver from a terminal device in which the driver is installed when the usage state managed by the usage state management unit agrees with a predetermined condition, wherein the driver delete unit deletes the driver by sending a driver deletion instruction to the terminal device.

17. A computer readable recording medium storing a program corresponding to a device driver for a device that executes a job generated by the driver, the program comprising instructions for causing a computer to execute:

usage state management processing for managing a usage state of the device by the driver; and job generation stop processing for stopping the generation of a job by the driver when the usage state managed by the usage state management processing agrees with a predetermined condition, wherein:

the usage state is the number of jobs issued to the device by the driver; and the job generation stop processing is processing to stop the generation of a job by the driver when the number of jobs issued by the driver has reached a predetermined number.

18. A computer readable recording medium storing a program corresponding to a device driver for a device that executes a job generated by the driver, the program comprising instructions for causing a computer to execute:

usage state management processing for managing a usage state of the device by the driver; and job generation stop processing for stopping the generation of a job by the driver when the usage state managed by the usage state management processing agrees with a predetermined condition, wherein the job generation stop processing stops the generation of a job by the driver by deleting the driver.

19. A computer-readable recording medium storing a program for a device that executes a job generated by a driver, the program comprising instructions for causing a computer to execute:

usage state management processing for managing a usage state of a device of each driver of a plurality of drivers; and job execution rejection processing for rejecting the execution of a job sent from a corresponding driver among the plurality of drivers when the usage state managed by the usage state management processing agrees with a predetermined condition, wherein:

the usage state is the number of jobs issued to the device by the individual drivers; and the job execution rejection processing is processing to reject the execution of a job sent from the driver which has issued a predetermined number of jobs.

20. A computer-readable recording medium storing a program for a device that executes a job generated by a driver, the program comprising instructions for causing a computer to execute:

usage state management processing for managing a usage state of a device of each driver of a plurality of drivers; and job execution rejection processing for rejecting the execution of a job sent from a corresponding driver among the plurality of drivers when the usage state managed by the usage state management processing agrees with a predetermined condition, wherein the job execution rejection processing notifies a deletion instruction to the driver which has issued the job when the execution of the job is rejected.

21. A computer readable recording medium storing a usage limiting program for a device that executes a job generated by a driver, the program comprising instructions for causing a computer to execute:

usage state management processing for managing a usage state of each driver of a plurality of drivers for a device; and driver delete processing for deleting a corresponding driver from a terminal device in which the driver is installed when the usage state managed by the usage state management processing agrees with a predetermined condition, wherein:

the usage state is the number of jobs issued to the device by the individual drivers; and the driver delete processing is processing to delete the driver which has issued a predetermined number of jobs from the terminal device in which the driver is installed.

22. A computer readable recording medium storing a usage limiting program for a device that executes a job generated by a driver, the program comprising instructions for causing a computer to execute:

usage state management processing for managing a usage state of each driver of a plurality of drivers for a device; and driver delete processing for deleting a corresponding driver from a terminal device in which the driver is installed when the usage state managed by the usage state management processing agrees with a predetermined condition, wherein:

the usage state is users of the driver; and the driver delete processing is processing to delete a corresponding driver from the terminal device in which the driver is installed when a user of the driver is not contained in user information on the users allowed to use the device.

23. A computer readable recording medium storing a usage limiting program for a device that executes a job generated by a driver, the program comprising instructions for causing a computer to execute:

usage state management processing for managing a usage state of each driver of a plurality of drivers for a device; and driver delete processing for deleting a corresponding driver from a terminal device in which the driver is installed when the usage state managed by the usage state management processing agrees with a predetermined condition, wherein:

the usage state is the number of pages printed by the device which is made to print by the individual drivers; and the driver delete processing is processing to delete the driver which has issued a job of a predetermined number of pages from the terminal device in which the driver is installed.

24. A computer readable recording medium storing a usage limiting program for a device that executes a job generated by a driver, the program comprising instructions for causing a computer to execute:

usage state management processing for managing a usage state of each driver of a plurality of drivers for a device; and driver delete processing for deleting a corresponding driver from a terminal device in which the driver is installed when the usage state managed by the usage state management processing agrees with a predetermined condition, wherein the driver delete processing deletes the driver by sending a driver deletion instruction to the terminal device.

* * * * *